US010130873B2

(12) United States Patent
Kim

(10) Patent No.: US 10,130,873 B2
(45) Date of Patent: *Nov. 20, 2018

(54) METHOD AND APPARATUS FOR PREVENTING A COLLISION BETWEEN SUBJECTS

(71) Applicant: Samsung Electronics Co., Ltd., Suwon-si, Gyeonggi-do (KR)

(72) Inventor: Yun-jung Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

This patent is subject to a terminal disclaimer.

(21) Appl. No.: 14/659,948

(22) Filed: Mar. 17, 2015

(65) Prior Publication Data

US 2015/0265920 A1  Sep. 24, 2015

(30) Foreign Application Priority Data

Mar. 21, 2014 (KR) .................. 10-2014-0033695
Nov. 28, 2014 (KR) .................. 10-2014-0169178
Feb. 6, 2015 (KR) .................. 10-2015-0018872

(51) Int. Cl.
*A63F 9/24* (2006.01)
*A63F 13/213* (2014.01)
(Continued)

(52) U.S. Cl.
CPC ............ *A63F 13/213* (2014.09); *A63F 13/00* (2013.01); *A63F 13/42* (2014.09); *A63F 13/428* (2014.09);
(Continued)

(58) Field of Classification Search
CPC ........ G06F 3/017; G06F 3/011; G06F 3/0304; G06F 3/04812; A63F 13/06; A63F 13/04;
(Continued)

(56) References Cited

U.S. PATENT DOCUMENTS 9,405,372 B2  8/2016 Yen et al.
2004/0193413 A1  9/2004 Wilson et al.
(Continued)

FOREIGN PATENT DOCUMENTS

CN  101380520 A  3/2009
CN  102008823 A  4/2011

OTHER PUBLICATIONS

Williams et al.; Exploring Large Virtual Environments with an HMD when Physical Space is Limited; Proceedings APGV 2007; Symposium on Applied Perception in Graphics and Visualization; ACM; New York, NY; Jul. 25, 2007; pp. 41-48; XP001510324.
(Continued)

*Primary Examiner* — Justin Myhr
(74) *Attorney, Agent, or Firm* — Jefferson IP Law, LLP

(57) ABSTRACT

An apparatus for executing a computer game are provided. The apparatus includes an output unit configured to transmit a first image generated based on a form of a first user participating in the computer game and a second image generated based on a form of a second user participating in the computer game to a display apparatus, and a control unit configured to predict a possibility of a collision between the first user and the second user, and to control transmitting warning information indicating the possibility of the collision to the display apparatus via the output unit, according to a result of the predicting.

15 Claims, 43 Drawing Sheets

(51) Int. Cl.

| | | |
|---|---|---|
| *A63F 13/49* | (2014.01) | |
| *A63F 13/44* | (2014.01) | |
| *G06T 7/20* | (2017.01) | |
| *A63F 13/577* | (2014.01) | |
| *A63F 13/825* | (2014.01) | |
| *A63F 13/00* | (2014.01) | |
| *A63F 13/428* | (2014.01) | |
| *A63F 13/814* | (2014.01) | |
| *A63F 13/42* | (2014.01) | |
| *A63F 13/5375* | (2014.01) | |
| *G06T 7/246* | (2017.01) | |

(52) U.S. Cl.
CPC .............. *A63F 13/44* (2014.09); *A63F 13/49* (2014.09); *A63F 13/5375* (2014.09); *A63F 13/577* (2014.09); *A63F 13/814* (2014.09); *A63F 13/825* (2014.09); *G06T 7/20* (2013.01); *G06T 7/251* (2017.01); *A63F 2300/643* (2013.01); *A63F 2300/646* (2013.01)

(58) Field of Classification Search
CPC .............. A63F 2300/1093; A63F 13/10; A63F 13/213; A63F 13/40; A63F 13/5375; A63F 2300/1087; A63F 2300/305; A63F 2300/643; A63F 13/49; A63F 13/537; A63F 13/843; G06K 9/00335; G06K 9/00355; G06K 9/00369; G06T 7/2046
See application file for complete search history.

(56) References Cited

U.S. PATENT DOCUMENTS

| | | |
|---|---|---|
| 2006/0152405 A1 | 7/2006 | Egri et al. |
| 2007/0135995 A1* | 6/2007 | Kikuchi ................. G01C 21/20 |
| | | 701/533 |
| 2011/0193939 A1 | 8/2011 | Vassigh et al. |
| 2011/0230263 A1 | 9/2011 | Ng |
| 2012/0287044 A1 | 11/2012 | Bell et al. |
| 2013/0005467 A1* | 1/2013 | Kim ........................ A63F 13/06 |
| | | 463/36 |
| 2013/0007616 A1 | 1/2013 | Bell et al. |
| 2013/0225296 A1 | 8/2013 | Kim |
| 2013/0251204 A1 | 9/2013 | Pulsipher et al. |

OTHER PUBLICATIONS

Cirio et al.; Walking in a Cube: Novel Metaphors for Safely Navigating Large Virtual Environments in Restricted Real Workspaces; IEEE Transactions on Visualization and Computer Graphics; Los Alamitos, CA, US; vol. 18, No. 4; Apr. 1, 2012; pp. 546-554; XP011490408.

* cited by examiner

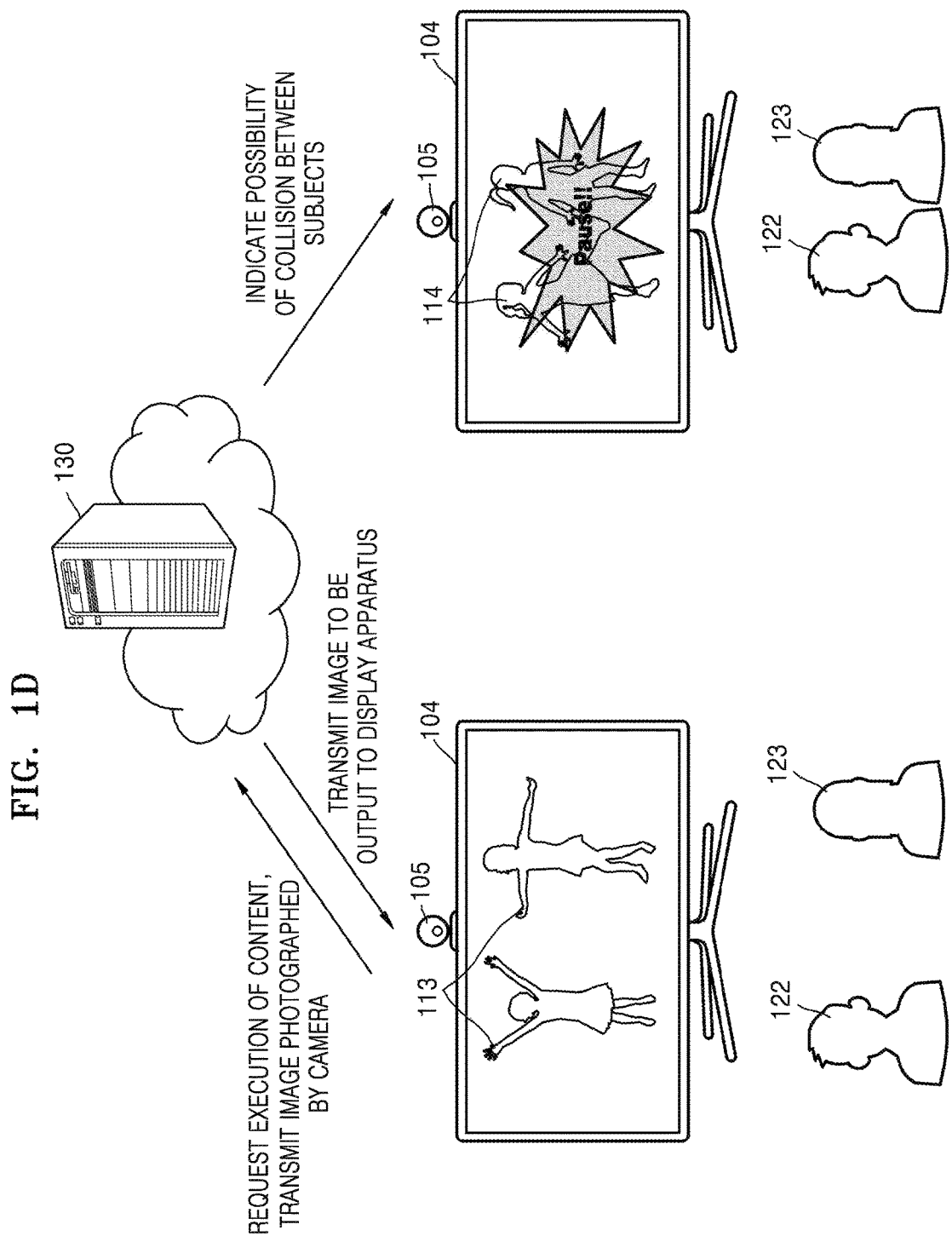

FIG. 4A
FIG. 4B
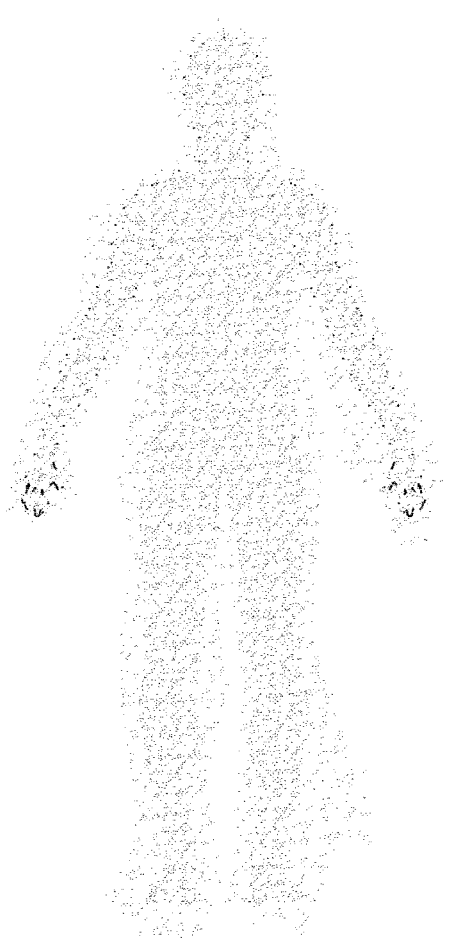
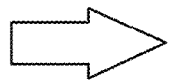
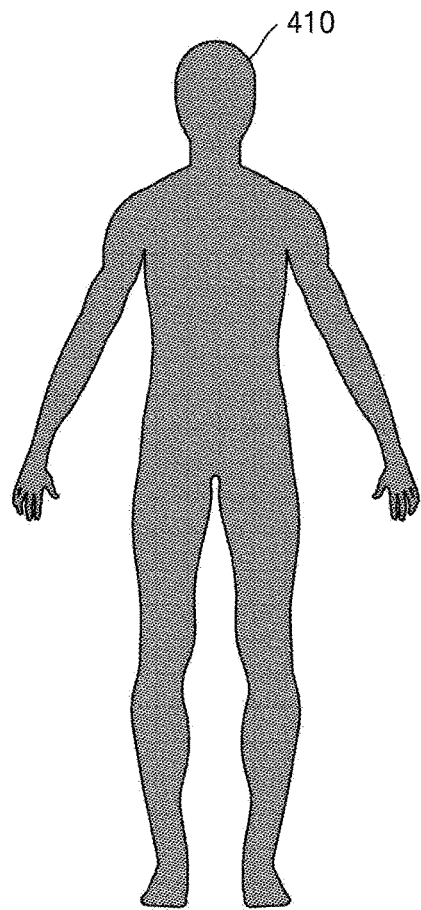

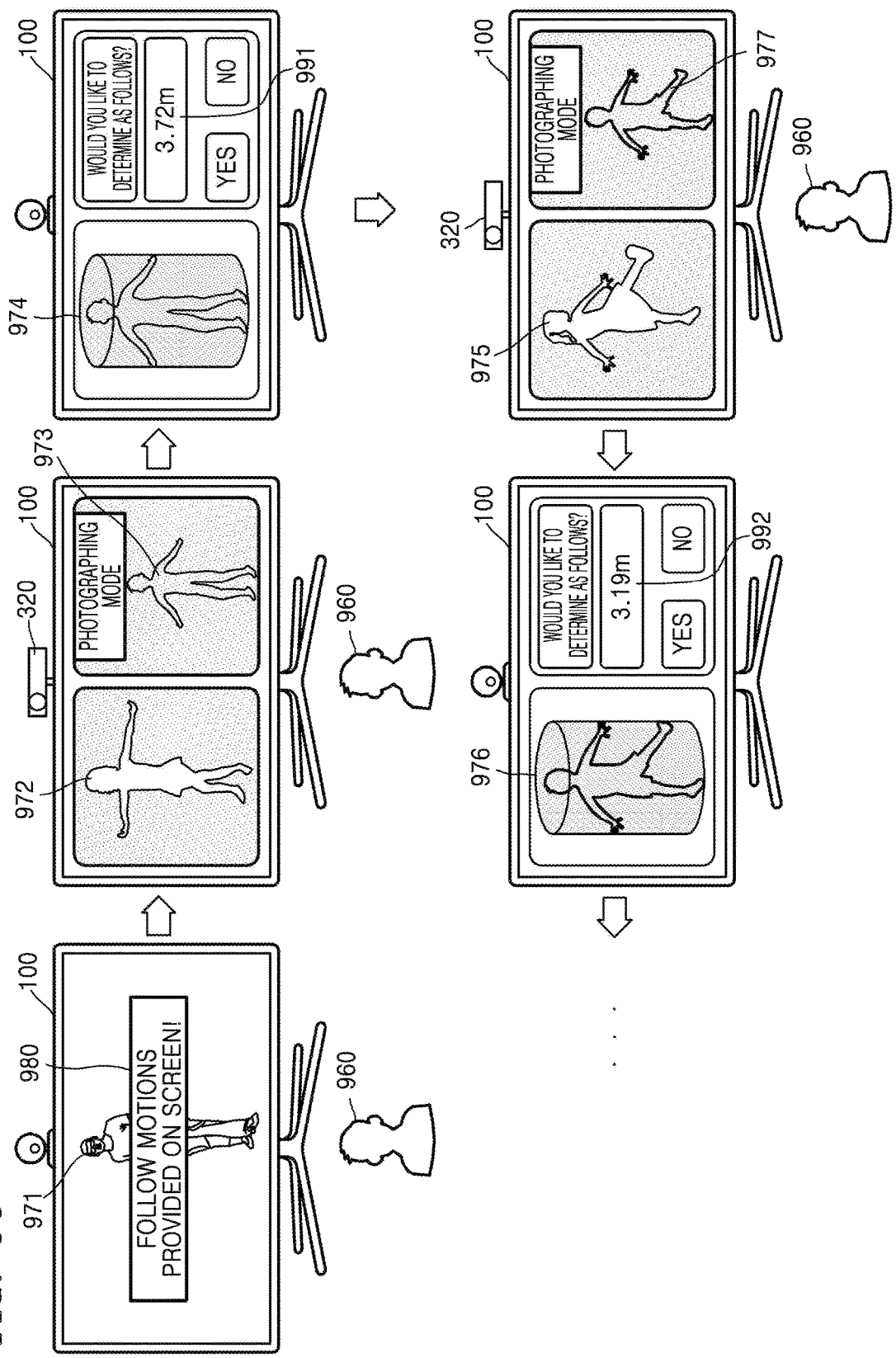

FIG. 10A
FIG. 10B
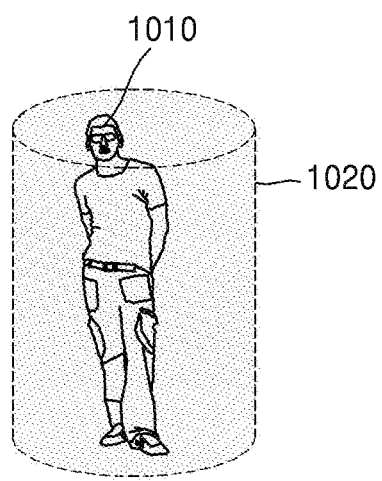
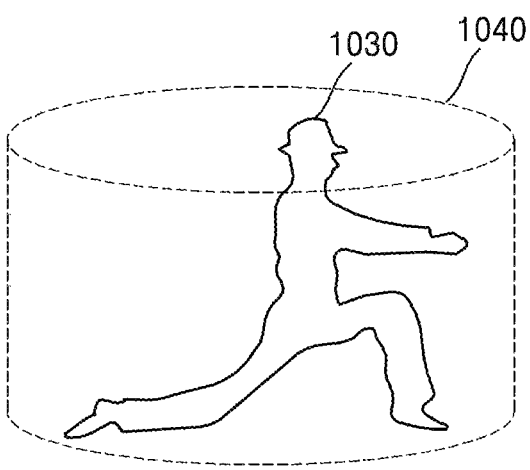

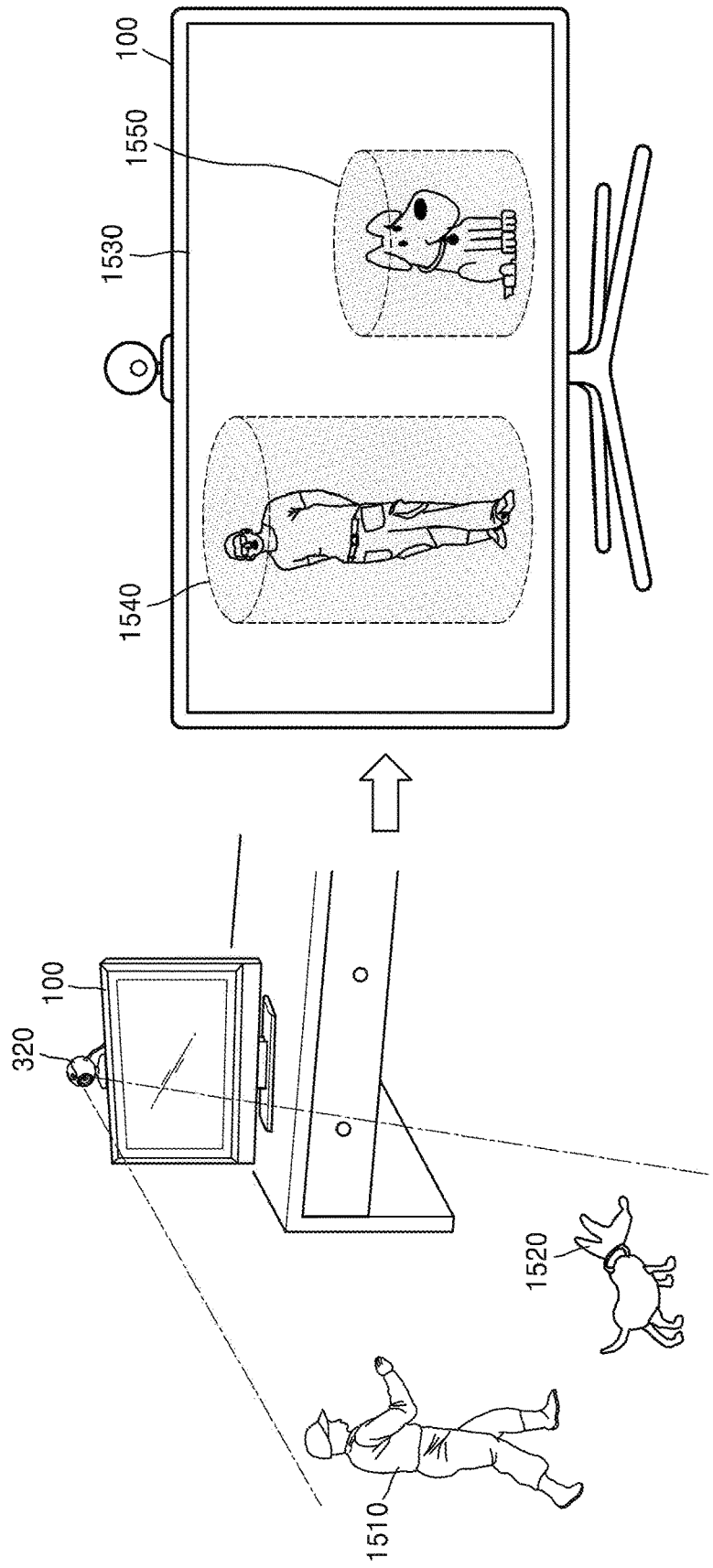

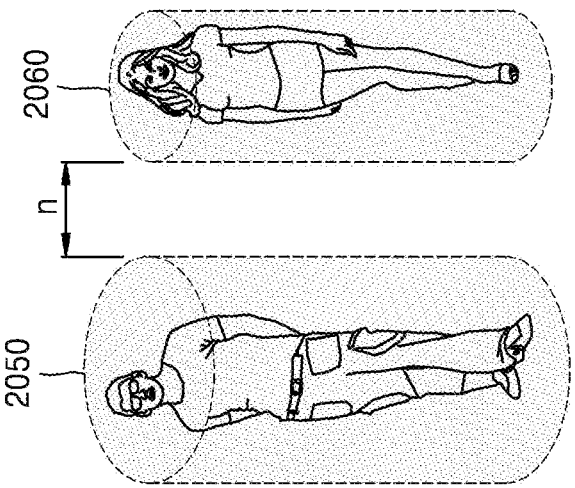
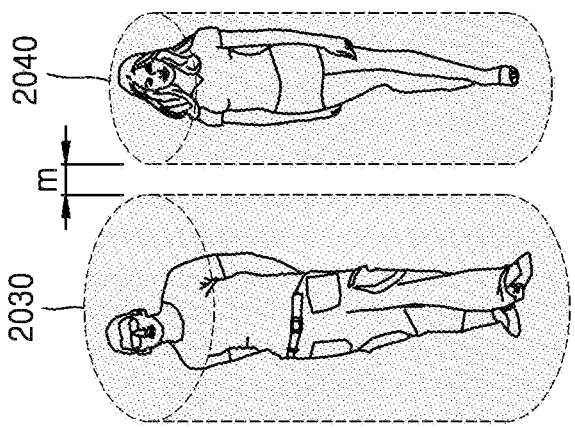
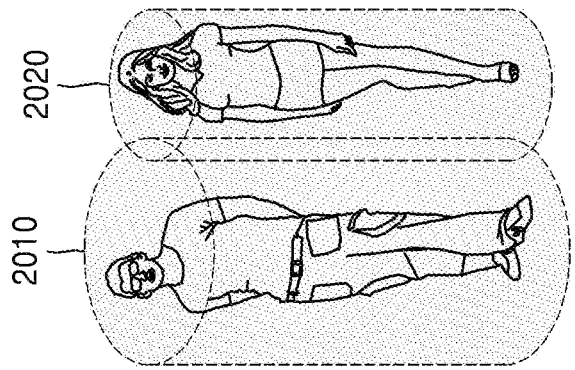

METHOD AND APPARATUS FOR PREVENTING A COLLISION BETWEEN SUBJECTS

CROSS-REFERENCE TO RELATED APPLICATION(S)

This application claims the benefit under 35 U.S.C. § 119(a) of a Korean patent application filed on Mar. 21, 2014 in the Korean Intellectual Property Office and assigned Serial No. 10-2014-0033695, of a Korean patent application filed on Nov. 28, 2014 in the Korean Intellectual Property Office and assigned Serial No. 10-2014-0169178, and of a Korean patent application filed on Feb. 6, 2015 in the Korean Intellectual Property Office and assigned Serial No. 10-2015-0018872, the entire disclosure of each of which is hereby incorporated by reference.

TECHNICAL FIELD

The present disclosure relates to a method and apparatus for preventing a collision between subjects.

BACKGROUND

A computer game, executed based on a gesture by a user participating in the computer game, has been developed. For example, a computer game, in which it is determined whether a mission is complete according to a motion of a user, has been developed.

However, while a computer game is being executed, a user may collide with another user who is in a place near the user or a thing that is disposed near the user, according to a motion of the user.

Accordingly, there is a demand for development of a method or an apparatus for preventing a collision of a user participating in a computer game with another user or a thing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for preventing a collision between subjects.

Another aspect of the present disclosure is to provide a non-transitory computer-readable recording storage medium having stored thereon a computer program, which, when executed by a computer, performs the method.

Additional aspects will be set forth in part in the description which follows and, in part, will be apparent from the description, or may be learned by practice of the presented various embodiments.

In accordance with an aspect of the present disclosure, an apparatus for executing a computer game is provided. The apparatus includes an output unit configured to transmit a first image generated based on a form of a first user participating in the computer game and a second image generated based on a form of a second user participating in the computer game to a display apparatus, and a control unit configured to predict a possibility of a collision between the first user and the second user, and to control transmitting warning information indicating the possibility of the collision to the display apparatus via the output unit, according to a result of the predicting.

The control unit may determine a first area, which includes a farthest point reachable by a part of the first user as the first user moves in a certain area, and determine a second area, which includes a farthest point reachable by a part of the second user as the second user moves in a certain area.

The control unit may determine that there is a possibility of a collision between the first user and the second user if the first area and the second area overlap with each other.

The control unit may predict a moving path of the first user and a moving path of the second user, and determine the first area and the second area by further considering the predicted moving paths.

The moving paths may be predicted based on details of the computer game.

The first image and the second image may each include an image generated by an external camera.

The warning information may include an image output from the external display apparatus or sound output from the external display apparatus.

The control unit may pause the execution of the computer game if it is determined that there is a possibility of a collision between the first user and the second user.

In accordance with another aspect of the present disclosure, a method of executing a computer game is provided. The method includes generating a first image based on a form of a first user participating in the computer game, generating a second image based on a form of a second user participating in the computer game, transmitting the first image and the second image to a display apparatus, predicting a possibility of a collision between the first user and the second user, and transmitting warning information indicating the possibility of the collision to the display apparatus based on a result of the predicting.

The method may further include determining a first area, which includes a farthest point reachable by a part of the first user as the first user moves in a certain area, and determining a second area, which includes a farthest point reachable by a part of the second user as the second user moves in a certain area.

The generating of the warning information may include generating of the warning information if the first area and the second area overlap with each other.

The method may further include predicting a moving path of the first user, wherein the determining of the first area includes determining the first area by further taking into account the predicted moving path.

The moving path may be predicted based on details of the computer game.

The first image and the second image each may include an image generated by an external camera.

The warning information may include an image output from the external display apparatus or sound output from the external display apparatus.

The method may further include pausing the execution of the computer game if it is determined that there is a possibility of a collision between the first user and the second user.

In accordance with an aspect of the present disclosure, an apparatus for executing a computer game is provided. The apparatus includes an output unit configured to transmit a first image generated based on a form of a user participating in the computer game and a second image generated based on a form of at least one subject located near the user to a display apparatus, and a control unit configured to predict a possibility of a collision between the first user and the subject, and to control transmitting of warning information indicating the possibility of the collision to the display apparatus via the output unit according to a result of the predicting.

In accordance with an aspect of the present disclosure, an apparatus for executing a computer game is provided. The apparatus includes an output unit configured to transmit a first image generated based on a form of a user participating in the computer game and a second image generated based on a form of at least one subject located near the user to a display apparatus, and a control unit configured to set a danger zone based on external input information, and, when the control unit determines that the user enters the danger zone, to control transmitting warning information, indicating a possibility of the entering by the user, to the display apparatus via the output unit.

In accordance with an aspect of the present disclosure, an apparatus for executing a computer game is provided. The apparatus includes an input unit configured to receive an input of an image signal and a control unit configured to control setting of a first area corresponding to a first object and a second area corresponding to a second object wherein the first object and the second object are included in the image signal, to measure a distance between the first area and the second area, and to output a predetermined message if a value of the measured distance is less than a predetermined value.

The first area may include a farthest point reachable by a part of a first subject as the first subject moves in a certain location, wherein the first subject corresponds to the first object, and the second area may include a farthest point reachable by a part of a second subject as the second subject moves in a certain location, wherein the second subject corresponds to the second object.

The control unit may predict a moving path of the first subject and a moving path of the second subject, and determine the first area and the second area by further considering the predicted moving paths.

The moving paths may be predicted based on details of the computer game.

The control unit may pause the execution of the computer game if the measured distance has a value less than the predetermined value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1D illustrates a diagram for explaining an example of executing content, the executing being performed by a server, according to an embodiment of the present disclosure;

FIGS. 4A and 4B illustrate diagrams for explaining an example of obtaining form information of a user, the obtaining being performed by a device, according to an embodiment of the present disclosure;

FIGS. 9A, 9B and 9C illustrate diagrams for explaining an example of determining a range of motion of a subject based on setting information input by a user, the determining being performed by a device, according to an embodiment of the present disclosure;

FIGS. 10A and 10B illustrate diagrams for explaining an example of determining a range of motion of a subject, the determining being performed by a device, according to an embodiment of the present disclosure;

FIGS. 15A and 15B illustrate diagrams for explaining an example of obtaining form information of a plurality of subjects and determining a range of motion of the plurality of subjects, the obtaining and the determining being performed by a device, according to an embodiment of the present disclosure;

FIGS. 20A, 20B, and 20C illustrate diagrams for explaining an example of comparing a shortest distance between subjects to a predetermined distance value, the comparing being performed by a device according to an embodiment of the present disclosure;

Throughout the drawings, it should be noted that like reference numbers are used to depict the same or similar elements, features, and structures.

DETAILED DESCRIPTION

Figure 1A:
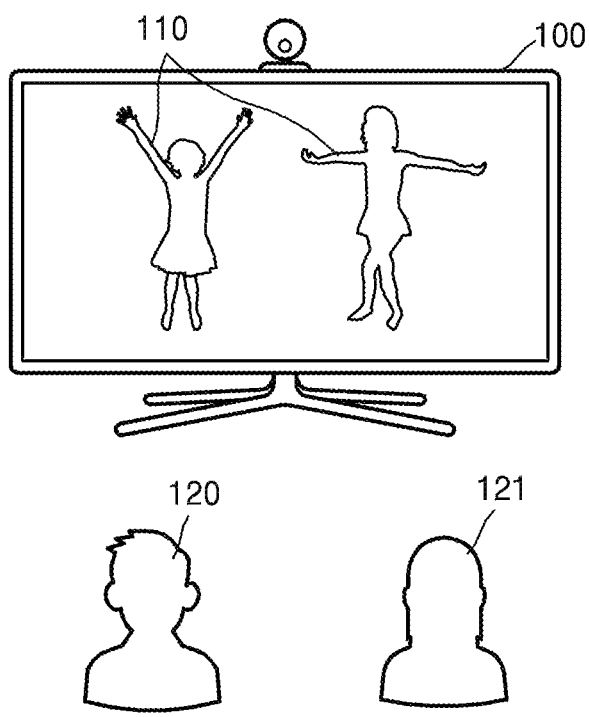
FIGS. 1A and 1B illustrate conceptual diagrams showing an example of a method of preventing a collision between a plurality of subjects according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be briefly described, and the inventive concept will be described in greater detail below.

General and widely-used terms have been employed herein, in consideration of functions provided in the inventive concept, and may vary according to an intention of one of ordinary skill in the art, a precedent, or emergence of new technologies. Additionally, in some cases, an applicant may arbitrarily select specific terms. Then, the applicant will provide the meaning of the terms in the description of the inventive concept. Accordingly, it will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises", "comprising", "includes", and/or "including", when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

A "device" used herein refers to an element that is included in a certain apparatus and accomplish a certain objective. In greater detail, a certain apparatus that includes a screen which may perform displaying and an interface for receiving information input by a user, receives a user input, and thus, accomplishes a certain objective may be included in an embodiment of the inventive concept without limitation.

The inventive concept will now be described more fully with reference to the accompanying drawings, in which various embodiments of the inventive concept are shown. The inventive concept may, however, be embodied in many different forms and should not be construed as being limited to the embodiments set forth herein. In the description of the inventive concept, certain detailed explanations of the related art are omitted when it is deemed that they may unnecessarily obscure the essence of the inventive concept. Like numbers refer to like elements throughout the description of the figures.

Figure 1B:
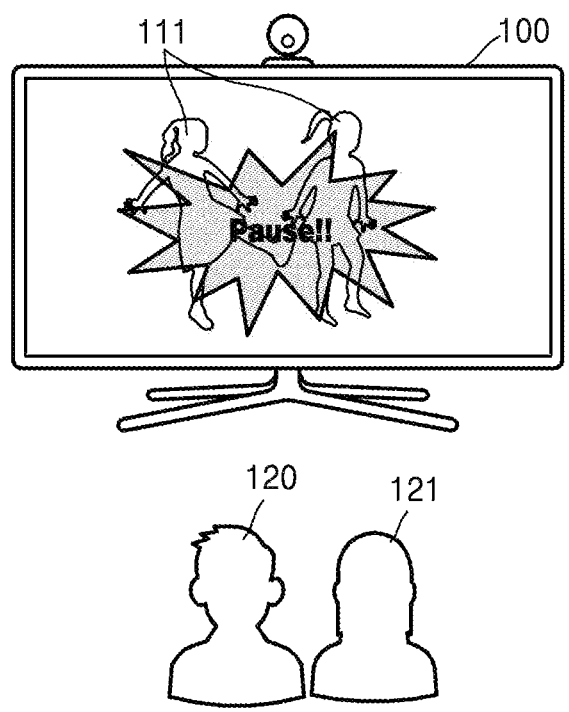

FIGS. 1A and 1B illustrate conceptual diagrams showing an example of a method of preventing a collision between a plurality of subjects according to an embodiment of the present disclosure.

Referring to FIGS. 1A and 1B, persons or things 120 and 121 that are located in front of a device 100, and objects 110 and 111 are shown, wherein the objects 110 and 111 are obtained when the persons or things 120 and 121 are photographed by using a camera included in the device 100 and output to a screen of the device 100. Hereinafter, the objects 110 and 111 respectively refer to images 110 and 111 that show the persons or things 120 and 121 output to the screen of the device 100. Additionally, hereinafter, a subject 120 or 121 refers to a person or a thing 120 or 121. In other words, the camera photographs the subjects 120 or 121, and the objects 110 or 111 which are images of the subject 120 or 121 are output to the screen of the device 100. For convenience of description, in FIGS. 1A and 1B, it is described that the objects 110 and 111 are images of users of content executed by the device 100, but the objects 110 and 111 are not limited thereto.

A subject may be a user who participates in the content, or a person or a thing that does not participate in the content. The object 110 may be an image obtained by photographing a person who uses the content, or an image obtained by photographing a person who does not use the content. Additionally, the object 110 may be an image obtained by photographing a thing owned by a person or a thing placed in a space where a person is located. Here, the thing may correspond to an animal, a plant, or furniture disposed in a space. The content refers to a program that may be controlled to recognize a motion of a user. For example, the content may be a computer game executed when the user takes a certain motion, such as a dancing game, a sport game, etc., or a program that outputs a motion of the user to a screen of the device 100.

If it is assumed that a computer game is executed, both the objects 110 and 111 may be images of users participating in the computer game. Alternatively, one of the objects 110 and 111 may be an image of a user participating in the computer game, and the other may be an image of a person that does not participate in the computer game or may be an image of a thing. As an example, if it is assumed that a dancing game is being executed, the objects 110 and 111 may be respective images of users who enjoy the dancing game together. As another example, one of the object 110 and the object 111 may be an image of a user who enjoys the dancing game, and the other may be an image of a person who is near the user and watches the dancing game played by the user. As another example, one of the objects 110 and 111 may be an image of a user, and the other may be an image of a person or an animal passing by the user or an image of a thing placed near the user. For example, while a dancing game is being executed, some of a plurality of persons may be set as persons participating in the dancing game (that is, users), and the others may be set as persons not participating in the dancing game (that is, non-users).

Hereinafter, an image of a person or an animal is referred to as a dynamic object, and an image of a thing or a plant that is unable to autonomously move or travel is referred to as a static object.

As an example, displayed objects may include an image of a first user and an image of a second user who are participating in the computer game. As another example, objects may include an image of a user participating in the computer game and an image of a person not participating in the computer game. As another example, objects may include an image of a user participating in the computer game, and an image of an animal placed near the user. As another example, objects may include an image of a user participating in the computer game, and an image of a thing placed near the user, for example, furniture.

An example in which the objects 110 and 111 include an image of the first user and an image of the second user who participate in the computer game is described later with reference to FIG. 11. An example in which the objects 110 and 111 include an image of a user participating in the computer game and an image of a person not participating in the computer game is described later with reference to FIG. 14. Additionally, an example in which the objects 110 and 111 respectively include an image of a user participating in the computer game and an image of an animal placed near the user is described later with reference to FIG. 15. An example in which the objects 110 and 111 respectively include an image of a user participating in the computer game and an image of a thing placed near the user is described later with reference to FIG. 16.

Additionally, the object may be a virtual character set by a user. For example, the user may generate a virtual character which does not actually exist as an object, by setting the content.

Referring to FIG. 1A, the users 120 and 121 use the content when they are separated from each other by a predetermined distance or more. For example, if it is assumed that the content is a dancing game, since the users 120 and 121 are separate from each other so that they do not collide with each other, the users 120 and 121 may safely take a certain motion.

Referring to FIG. 1B, since the users 120 and 121 are close to each other (i.e., within a predetermined distance), if at least one of the users 120 and 121 takes a certain motion, the at least one of the other users 120 and 121 may collide with the user.

A collision described herein refers to a physical contact between the users 120 and 121. Alternatively, a collision refers to a contact of the user 120 with another person, an animal, a plant, or furniture which is located near the user 120. In other words, a collision refers to a contact of a part of the user 120 with a part of a thing 121. As an example, if a part of a user such as his/her head, arm, trunk, or leg contacts a part of another user, it is understood that the two users collide with other. As another example, if a part of a user, such as his/her head, arm, trunk, or leg contacts the table, it is understood that the user and the table collide with each other.

If subjects collide with each other, a person or an animal corresponding to one of the subjects may get injured or a thing corresponding to the subjects may be broken or break down. Accordingly, the device 100 may predict a possibility of a collision between the subjects. If it is determined that the possibility of a collision between the subjects is high, the device 100 may output certain warning information. The warning information may be light, a color, or a certain image output from the screen of the device 100, or sound output from a speaker included in the device 100. Additionally, if the device 100 is executing the content, the device 100 may stop or pause execution of content as an example of the warning information.

According to the warning information output by the device 100, a person or an animal corresponding to objects may stop a motion, and thus, a collision between the objects may be prevented.

In FIGS. 1A and 1B, it is shown that the device 100 executes the content, for example, a computer game, and outputs an image and/or a sound, but the executing of the content and the outputting of the image and sound are not limited thereto. Additionally, a camera may be an apparatus separate from the device 100, or may be included in the device 100. Additionally, an apparatus for executing content and an apparatus for outputting an image and sound may be present separately from each other.

Figure 1C:
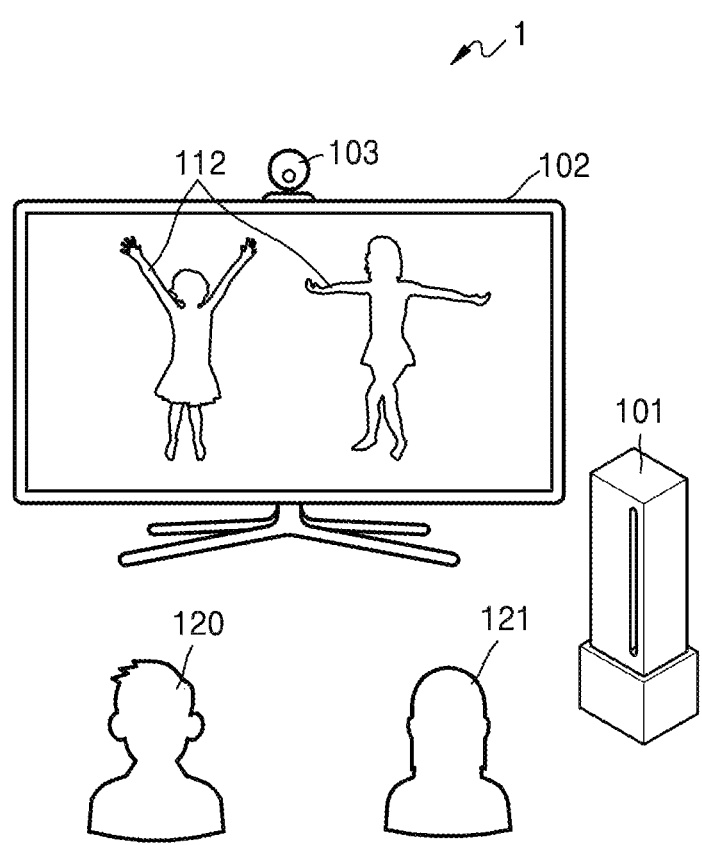
FIG. 1C illustrates a configuration map illustrating an example in which an apparatus for executing content and an apparatus for outputting an image and sound are present independently from each other according to an embodiment of the present disclosure.

FIG. 1C illustrates a configuration map illustrating an example in which an apparatus for executing content and an apparatus for outputting an image and sound are present independently from each other according to an embodiment of the present disclosure.

Referring to FIG. 1C, a system 1 includes an apparatus 101 for executing content, a display apparatus 102, and a camera 103. If it is assumed that the content is a computer game, the apparatus 101 for executing content refers to a game console.

The camera 103 captures an image of a user participating in the computer game or at least one object placed near the user, and transmits the captured image to the apparatus 101 for executing the content. The captured image refers to an image that shows a form of the user or the at least one object.

The apparatus 101 for executing the content transmits the image, transmitted from the camera 103, to the display apparatus 102. Additionally, if it is determined that there is a possibility of a collision between subjects, the apparatus 101 for executing the content generates warning information indicating that there is the possibility of the collision. Additionally, the apparatus 101 for executing the content transmits the warning information to the display apparatus 102. As an example, objects 112 may include an image of the first user 120 and an image of the second user 121. As another example, the objects 112 may include an image of the user 120 participating in the computer game and the person 121 not participating in the computer game. As another example, the objects 112 may include an image of the user 120 participating in the computer game and an image of the animal 121 placed near the user 120. As another example, the objects 112 may include the user 120 participating in the computer game and the thing 121 placed near the user 120, for example, furniture.

The display apparatus 102 outputs the image or the warning information transmitted from the apparatus 101 for executing the content. The warning information may be light, a color, a certain image output from the screen of the display apparatus 102, or sound output from a speaker included in the display apparatus 102, etc.

As described above with reference to FIGS. 1A through 1C, content is executed by the device 100 or the apparatus 101 for executing content. However, the execution of content is not limited thereto. In other words, content may be executed by a server, and the device 100 or the display apparatus 102 may output an execution screen of the content.

FIG. 1D illustrates a diagram for explaining an example of executing content, the executing being performed by a server, according to an embodiment of the present disclosure.

Referring to FIG. 1D, the server 130 may be connected to a device 104 via a network. A user 122 requests the server 130 to execute content. For example, the user 122 may log on to the server 130 via the device 104 and select content stored in the server 130 so as to execute the content.

When the content is executed, the server 130 transmits an image to be output to the device 104. For example, if the content is a computer game, the server 130 may transmit an initial setting screen or an execution screen of the computer game to the device 104.

The device 104 or a camera 105 transmits an image captured by the camera 105 to the server 103. The image captured by the camera 105 (that is, the image that includes objects 113 and 114) is output to a screen of the device 104. The device 104 may combine and output the execution screen of the content with the image captured by the camera 105. For example, if the content is a dancing game, the device 104 may output an image showing a motion required for the user 122 together with an image obtained by photographing the user 122.

A subject 123 shown in FIG. 1D may be a person, an animal, a plant, or a thing, for example, furniture. In other words, the subject 123 may be another user who enjoys the content with the user 122 together or a person who is near the user 122. Alternatively, the subject 123 may be an animal, a plant, or a thing which is placed near the user 122.

While the content is being executed, if it is predicted that the subjects 122 and 123 are to collide with each other, the server 130 or the device 104 may generate a warning signal.

As an example, a possibility of a collision between the subjects 122 and 123 may be predicted by the server. If the subjects 122 and 123 are predicted to collide with each other, the server 130 may notify the device 104 that there is a possibility of a collision between the subjects 122 and 123, and the device 104 may output a warning signal.

As another example, a possibility of a collision between the subjects 122 and 123 may be predicted by the device 104. In other words, the server 130 may perform only execution of content, and the predicting of a possibility of a collision between the subjects 123 and 123 and the outputting of the warning signal may be performed by the device 104.

Hereinafter, with reference to FIGS. 2 through 27, an example of preventing a collision between subjects, which is performed by a device (e.g., device 100, device 104, etc.), is described.

Figure 2:
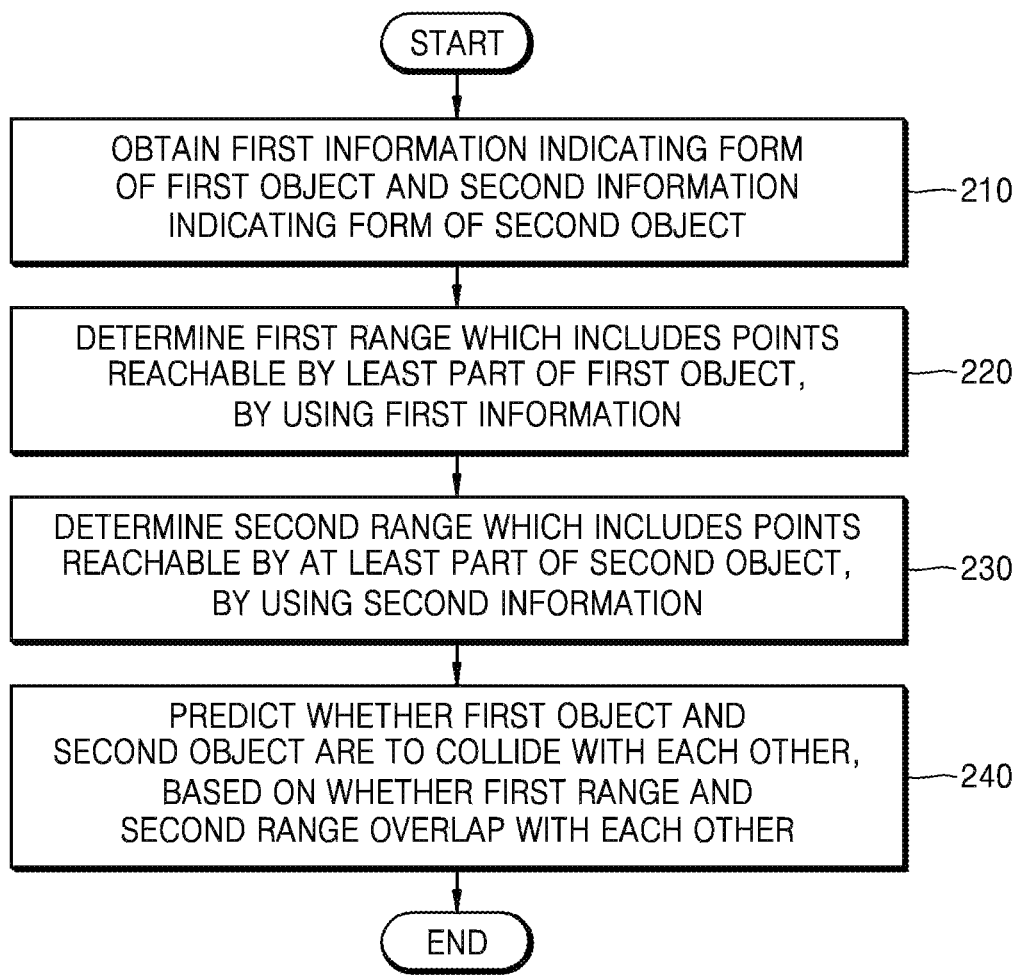
FIG. 2 illustrates a flowchart showing an example of a method of preventing a collision between a plurality of subjects according to an embodiment of the present disclosure

FIG. 2 illustrates a flowchart showing an example of a method of preventing a collision between a plurality of subjects according to an embodiment of the present disclosure.

Figure 29:
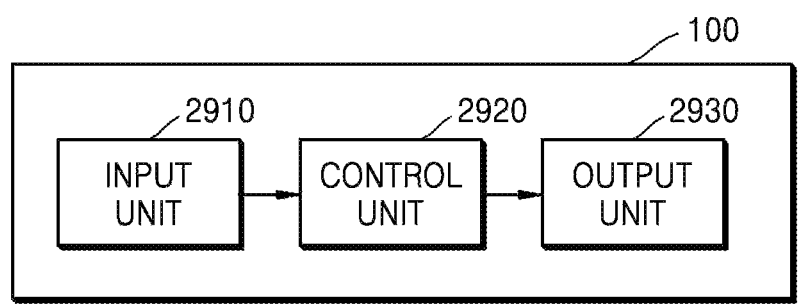
FIG. 29 illustrates a block diagram of an example of a device according to an embodiment of the present disclosure.
Figure 31:
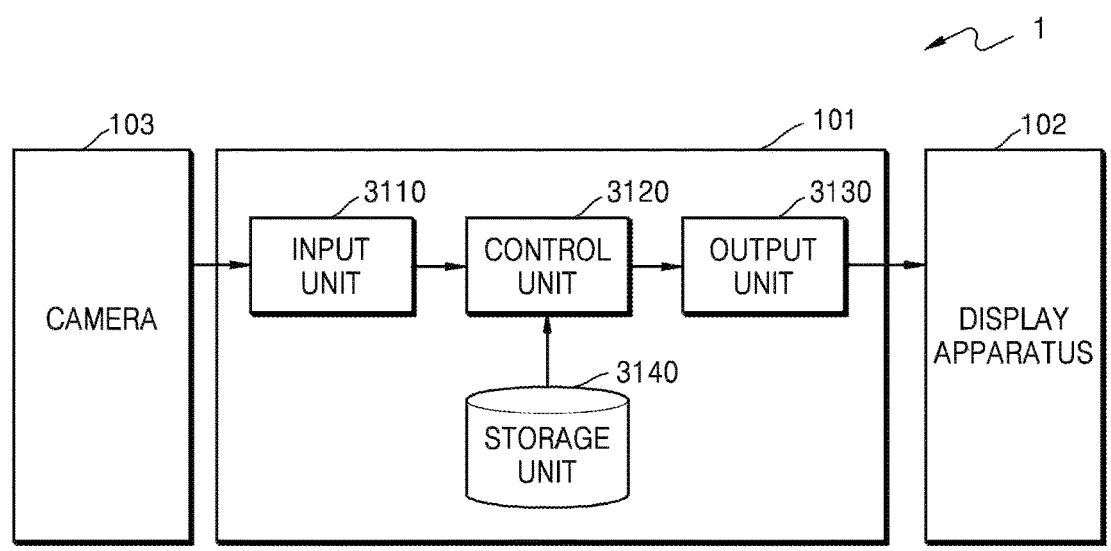
FIG. 31 illustrates a block diagram of an example of a system for executing content according to an embodiment of the present disclosure.

Referring to FIG. 2, the method of preventing a collision between the plurality of subjects includes operations, which are processed in time series by the device 100 as shown in FIG. 29 or the apparatus 101 for executing content as shown in FIG. 31. Accordingly, it will be understood that descriptions to be provided with regard to the device 100 shown in FIG. 29 or the apparatus 101 for executing content shown in FIG. 31 may also be applied to the method described with reference to FIG. 2, even if the descriptions are not provided again.

In operation 210, the device 100 obtains a first object representing a form of a first subject and a second object representing a form of a second subject. A form described herein is an outer shape of a subject, and includes a length and a volume of the subject as well as the shape of the subject. As an example, if it is assumed that an object is an image of a person, the object includes all information indicating an outer shape of the person such as a whole shape from a head to feet, a height, a length of legs, a thickness of a trunk, a thickness of arms, a thickness of legs of the person, and the like. As another example, if it is assumed that an object is an image of a chair, the object includes all information indicating an outer shape of the chair such as a shape, a height, a thickness of legs of the chair, and the like.

As an example, if it is assumed the device 100 executes the content, the first object refers to an image of a user who uses the content, and the second object refers to an image of another user who uses the content, or an image of a subject who does not use the content. If the second object is an image of a subject that does not use content, the second object refers to either a dynamic object or a static object. An image of a person or an animal is referred to as a dynamic object, and an image of a thing or a plant that may not autonomously move or travel is referred to as a static object. The content described herein refers to a program which requires a motion of a user. For example, a game executed based on a motion of the user may correspond to the content.

As another example, if it is assumed that content is not executed, the first object and the second object respectively refer to either a dynamic object or a static object. A meaning of the static object and the dynamic object is described above. For example, if it is assumed that the device 100 is installed at a location near a crosswalk, an image of a passenger walking across the crosswalk or a vehicle driving on a driveway may correspond to a dynamic object, and an image of an obstacle located near the sidewalk may correspond to a static object.

Hereinafter, it is described that the first object and the second object are respectively an image obtained by photographing a single subject (that is, a person, an animal, a plant, or a thing), but the first object and the second object are not limited thereto. In other words, the first object or the second object may be an image obtained by photographing a plurality of objects all together.

The device 100 may obtain a first image and a second image through an image captured by a camera. The device 100 may obtain not only information about an actual form of a subject (that is, a person, an animal, a plant, or a thing) corresponding to an object (hereinafter, referred to as form information), but also information about a distance between the subject and the camera and information about a distance between a plurality of subjects, based on the first image and the second image. Additionally, the device 100 may obtain information about colors of the subject and a background, according to a type of the camera.

For example, the camera may be a depth camera. The depth camera refers to a camera for generating an image that includes not only a form of a target to be photographed, but also three-dimensional (3D) information about a space (in other words, information about a distance between the target to be photographed and the camera or information about a distance between targets to be photographed). As an example, the depth camera may refer to a stereoscopic camera for generating an image that includes 3D information of a space by using images captured by two cameras that are present in locations that are different from each other. As another example, the depth camera may refer to a camera for generating an image that includes 3D information of a space by using a pattern of light which is emitted toward the space and reflected back to the camera by things within the space. As another example, the depth camera may be a camera for generating an image that includes 3D information of a space based on an amount of electric charges corresponding to light which is emitted toward the space including an object and reflected back to the camera by things that are present within the space. However, the camera is not limited thereto, and may correspond to any camera that may capture an image that includes information about a form of an object and a space without limitation.

Additionally, the device 100 may obtain form information of a subject corresponding to a subject, based on data stored in a storage unit (e.g., storage unit 2940 shown in FIG. 29). In other words, form information of a subject which may be obtained in advance and may be stored in a storage unit. In that case, the device 100 may read the form information stored in the storage unit.

Descriptions to be provided with reference to FIGS. 3 through 16 may be performed before content is executed. For example, if it is assumed that the content is a computer game, the descriptions provided hereinafter with reference to FIGS. 3 through 16 may correspond to operations that are to be performed before the computer game is started.

Hereinafter, with reference to FIG. 3, an example of obtaining form information, which is performed by a device (e.g., device 100), is described.

Figure 3:
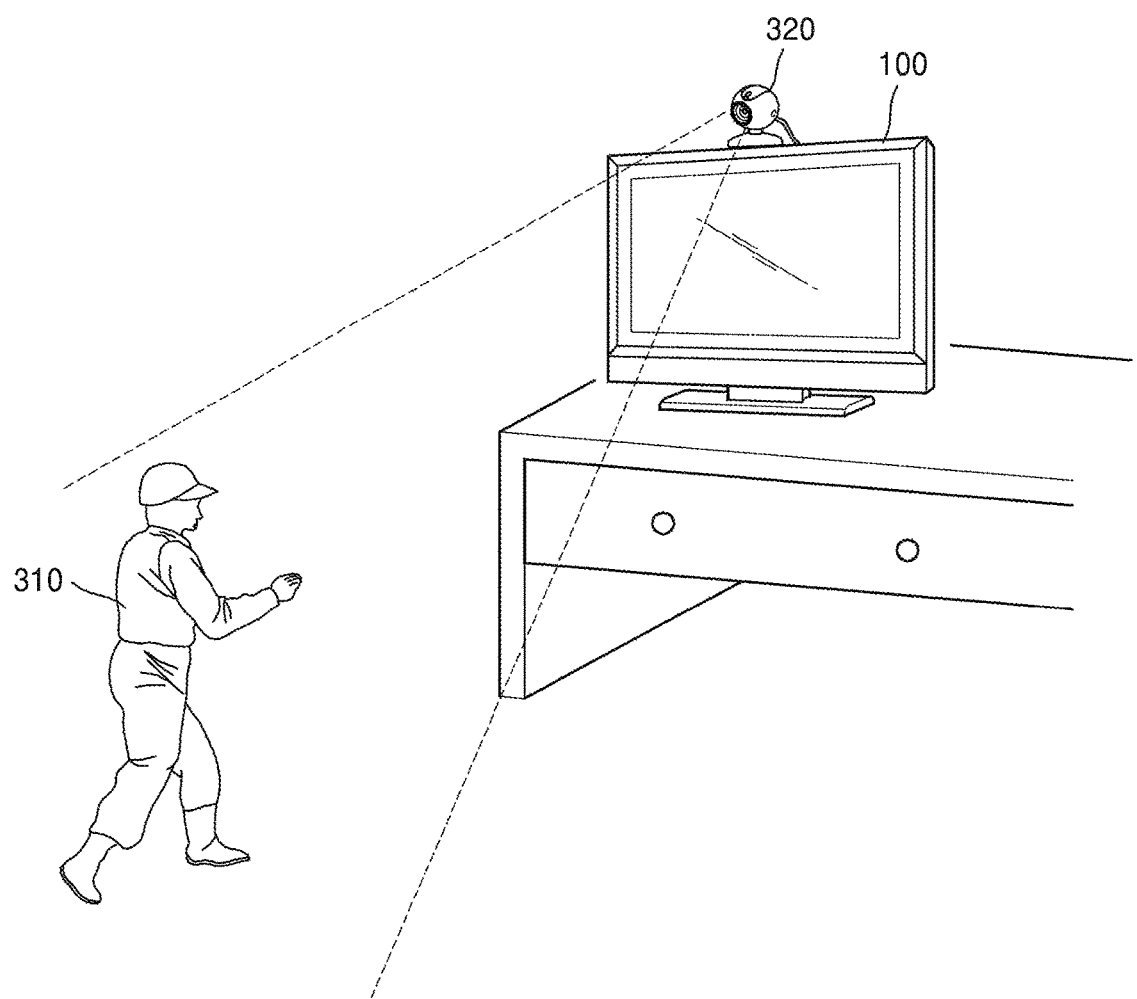
FIG. 3 illustrates a diagram for explaining an example of obtaining form information of a subject, the obtaining being performed by a device, according to an embodiment of the present disclosure.

FIG. 3 illustrates a diagram for explaining an example of obtaining form information, the obtaining being performed by a device, according to an embodiment of the present disclosure.

Referring to FIG. 3, a user 310, the device 100, and a camera 320 are illustrated. Hereinafter, for convenience of description, it is described that the device 100 includes a screen for displaying an image, and the camera 320 and the device 100 are devices separate from each other. However, the camera 320 and the device 100 are not limited thereto. In other words, the camera 320 may be included in the device 100. Additionally, it is described that the camera 320 is a camera for generating an image by using light which is emitted toward a space including an object and reflected back to the camera by both the object and things within the space. However, as described with reference to FIG. 2, the camera 320 is not limited thereto.

If a screen of the device 100 and a touch pad form a layered structure to constitute a touchscreen, the screen may be also used as an input unit as well as an output unit. The screen may include at least one of a liquid crystal display (LCD), a thin-film transistor-liquid crystal display (TFT-LCD), an organic light-emitting diode (OLED), a flexible display, a 3D display, and an electrophoretic display. According to an implementation type of the screen, the device 100 may include two or more screens. The two or more screens may be disposed to face each other by using a hinge.

The camera 320 emits light toward a space that includes the user 310, and obtains light reflected by the user 310. Then, the camera 320 generates data regarding a form of the user 310 by using the obtained light.

The camera 320 transmits the data regarding the form of the user 310 to the device 100, and the device 100 obtains form information of the user 310 by using the transmitted data. Then, the device 100 outputs an object that includes the form information of the user 310 to the screen of the device 100. Thus, the form information of the user 310 may be output to the screen of the device 100. Additionally, the device 100 may also obtain information about a distance between the camera 320 and the user 310 by using the data transmitted from the camera 320.

Hereinafter, with reference to FIG. 4, an example of obtaining the form information of the user 310 by using the data transmitted from the camera 320, which is performed by the device 100, is described.

FIGS. 4A and 4B illustrate diagrams for explaining an example of obtaining form information of a user, the obtaining being performed by a device, according to an embodiment of the present disclosure.

Referring to FIGS. 4A and 4B, an example of data that is extracted from data transmitted from the camera 320 and an example of a form 410 of a user which is estimated by using the extracted data are respectively illustrated. In an embodiment, the estimating is performed by the device 100.

The device 100 extracts a predetermined range of area from the data transmitted from the camera 320. The predetermined range of area refers to an area in which a user is present. In other words, the camera 320 emits light toward a space, and then, if the emitted light is reflected from things (including a user) which are present in the space and reflected back to the camera 320, the camera 320 calculates a depth value corresponding to each pixel, by using the light that is reflected back to the camera 320. The calculated depth value may be expressed as a degree of brightness of a point corresponding to a pixel. In other words, if light emitted by the camera 320 is reflected from a location near the camera 320 and reflected back to the camera 320, a dark spot corresponding to the location may be displayed. If light emitted by the camera 320 is reflected from a location far away the camera 320 and returns to the camera 320, a bright spot corresponding to the location may be displayed. Accordingly, the device 100 may determine a form of a thing (including the user) located in the space toward which the light is emitted and a distance between the thing and the camera 320, by using data transmitted from the camera 320 (for example, a point corresponding to each pixel).

The device 100 may extract data corresponding to an area, in which the user is present, from the data transmitted from the camera 320, and obtain information about a form of the user by removing noise from the extracted data. Additionally, the device 100 may estimate a skeleton representing the form of the user, by comparing the data obtained by removing the noise from the extracted data to various poses of a person which are stored in the storage unit 2940. Additionally, the device 100 may estimate the form 410 of the user by using the estimated skeleton and obtain form information of the user by using the estimated form 410 of the user.

Hereinafter, an example of outputting form information of a user obtained by the device 100 is described with reference to FIG. 5.

Figure 5:
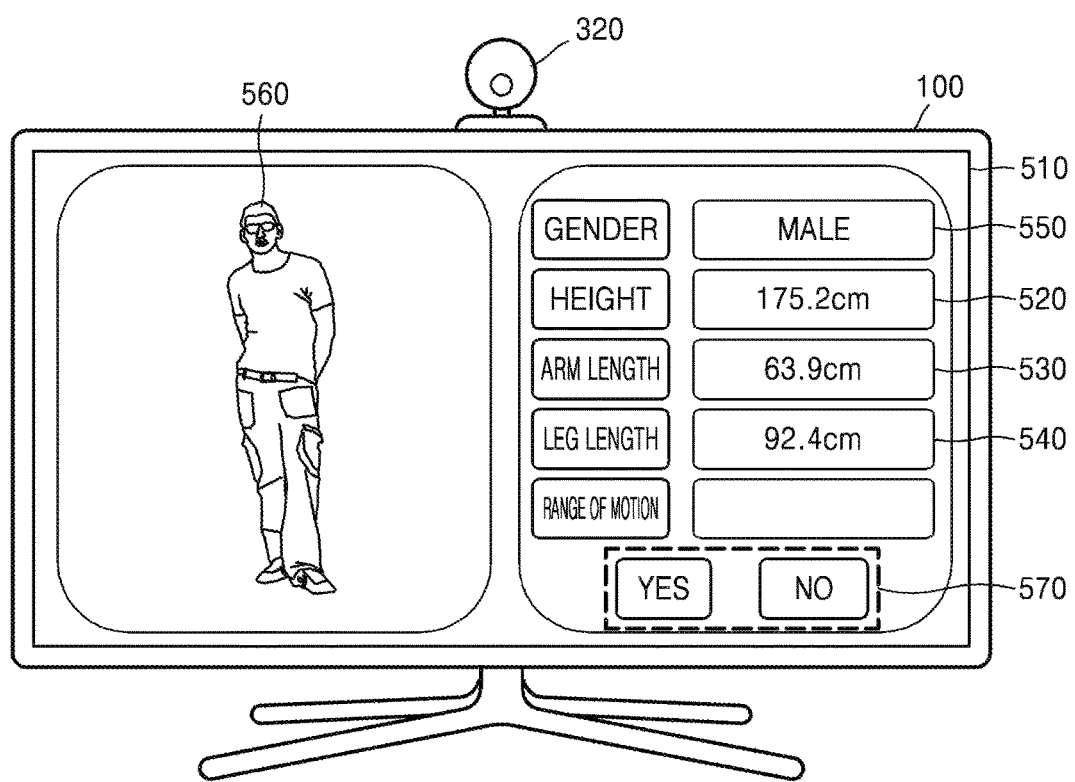
FIG. 5 illustrates a diagram showing an example of outputting form information of a user on a screen of a device, according to an embodiment of the present disclosure.

FIG. 5 illustrates a diagram showing an example of outputting form information of a user on a screen of a device according to an embodiment of the present disclosure.

Referring to FIG. 5, the form information of a user may be output to a screen 510 of the device 100. For example, a height 520, an arm length 530, and a leg length 540 of the user may be output to the screen 510. Additionally, information about a gender 550 of the user may be output to the screen 510. The gender 550 of the user may be determined by the device 100 by analyzing data transmitted from the camera 320 or may be input directly by the user.

Additionally, an object 560 corresponding to the user may be output to the screen 510. The object 560 may be a form corresponding to data obtained by the camera 320 or may be a virtual form generated by form information of the user. For example, the object 560 may be a form photographed by the camera 320, or may be a virtual form generated by combining the height 520, the arm length 530, the leg length 540, and the gender 550. Additionally, a form of the object 560 may be determined based on information directly input by the user. For example, the object 560 may be a game character generated so that form information of the user is reflected in the object 560.

An icon 570 for asking the user whether or not the form information of the user may be stored may be displayed on the screen 510. If at least one of the height 520, the arm length 530, the leg length 540, the gender 550, and the object 560 should not be stored (e.g., needs to be modified), the user selects an icon indicating "No". Then, the device 100 may obtain the form information of the user again, and the camera 320 may be re-operated. If the user selects an icon indicating "Yes", the form information of the user is stored in the storage unit 2940 included in the device 100.

As described above with reference to FIGS. 3 through 5, the device 100 may identify a user by using data transmitted from the camera, and obtain form information of the identified user. The device 100 may also add another person or thing or delete a subject captured by the camera 320, based on information input by the user. In other words, the user may add a virtual subject or a subject that is not included in the data transmitted by the camera 320. Additionally, the user may delete an object that is photographed by the camera 320 and displayed on the screen of the device 100. Hereinafter, an example of additionally displaying an object on a screen or deleting a displayed object, which is performed by the device 100, is described with reference to FIGS. 6A through 7B.

Figure 6A:
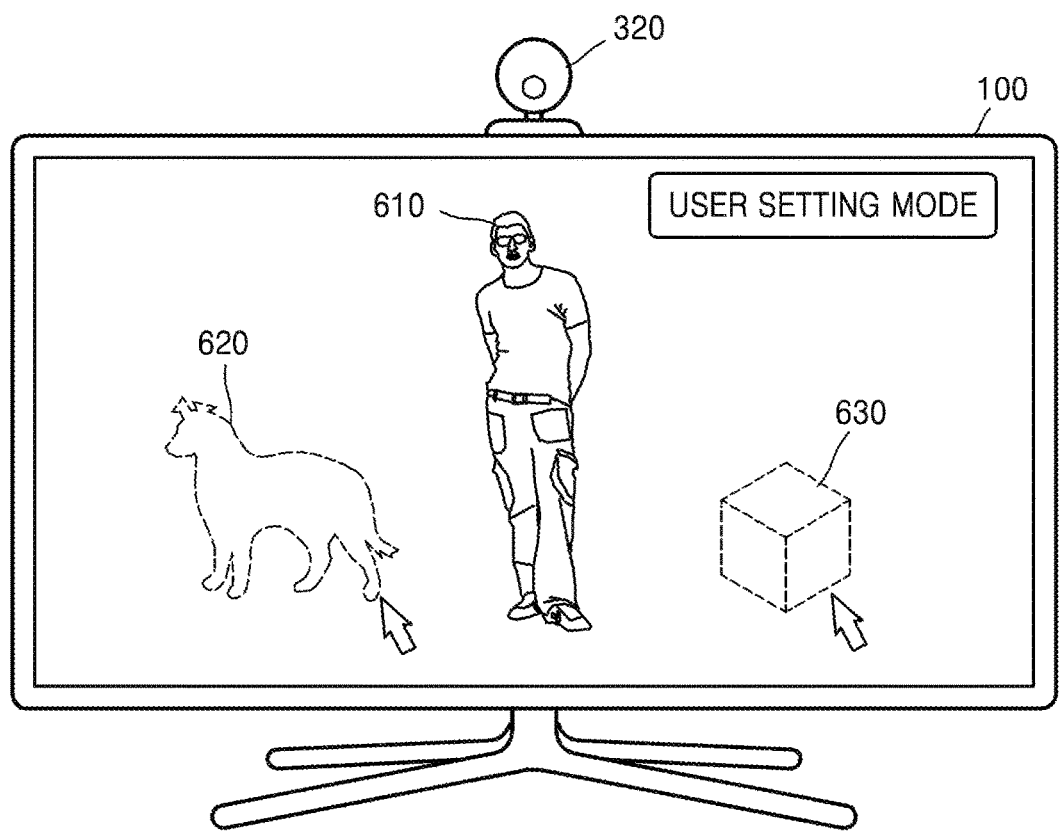
FIGS. 6A and 6B illustrate diagrams for explaining an example of adding an object, the adding being performed by a device, according an embodiment of the present disclosure.
Figure 6B:
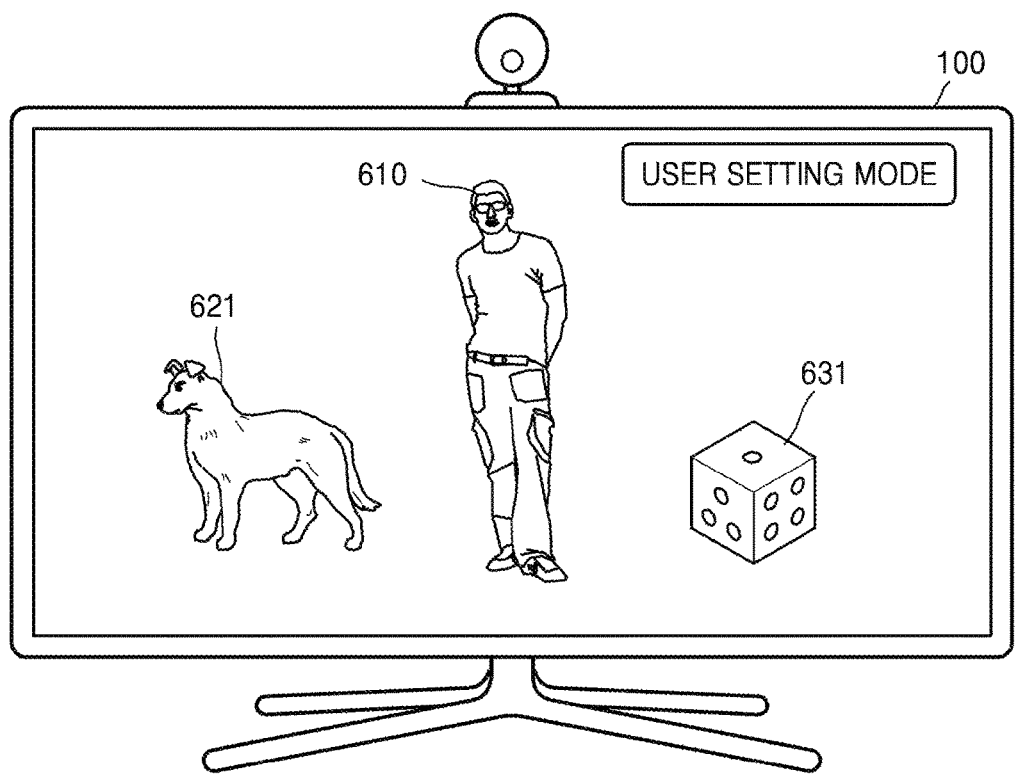

FIGS. 6A and 6B illustrate diagrams for explaining an example of adding an object, the adding being performed by a device, according to an embodiment of the present disclosure.

Referring to FIG. 6A, an object 610 representing a user is shown on a screen of the device 100. It is assumed that the object 610, shown in FIG. 6A, is an image of a user of content.

Data transmitted by the camera 320 may not include all information about in a photographing space. In other words, the camera 320 may not generate data that includes information about all persons, animals, plants, and things located in the photographing space, according to an effect such as performance or a surrounding environment of the camera 320. The user may arbitrarily set a virtual object (that is, an image representing a virtual subject), and the device 100 may obtain form information about the set virtual object.

As an example, even though a dog is actually present in a location near a user, data generated by the camera 320 may not include information about a form of the dog. Then, the user may input a form 620 of the dog via an input unit (e.g., input unit 2910) included in the device 100, and the device 100 may output an object representing the dog based on the input form 620 of the dog. In this case, the device 100 may estimate form information of the dog (for example, a size or a length of legs of the dog), by using a ratio between an object 620 representing the dog and the object 610 representing the user.

As another example, even though a chair is not actually present in a location near the user, the user may input a form 630 of the chair via the input unit 2910 included in the device 100. Additionally, the device 100 may output an object representing the chair to the screen based on the input form 630 of the chair. The device 100 may estimate form information of the chair (for example, a shape or a size of the chair), by using a ratio between the object 630 representing the chair and the object 610 representing the user. Alternatively, the device may output a simple object, such as a box, representing the chair as illustrated in FIG. 6A.

Referring to FIG. 6B, the object 610 representing the user and objects 621 and 631 which are added by the user are output to the screen of the device 100. The device 100 may output the objects 621 and 631, added based on information input by the user, to the screen.

Figure 7A:
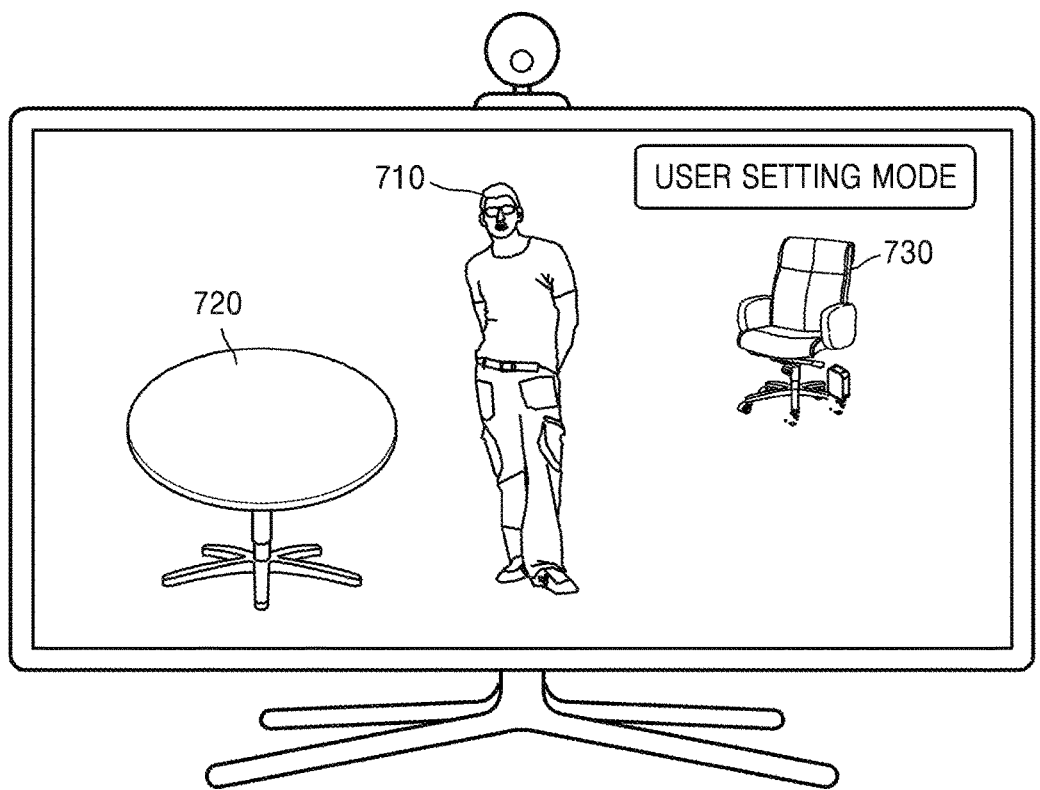
FIGS. 7A and 7B illustrate diagrams for explaining an example of deleting an object, the deleting being performed by a device, according to an embodiment of the present disclosure.
Figure 7B:
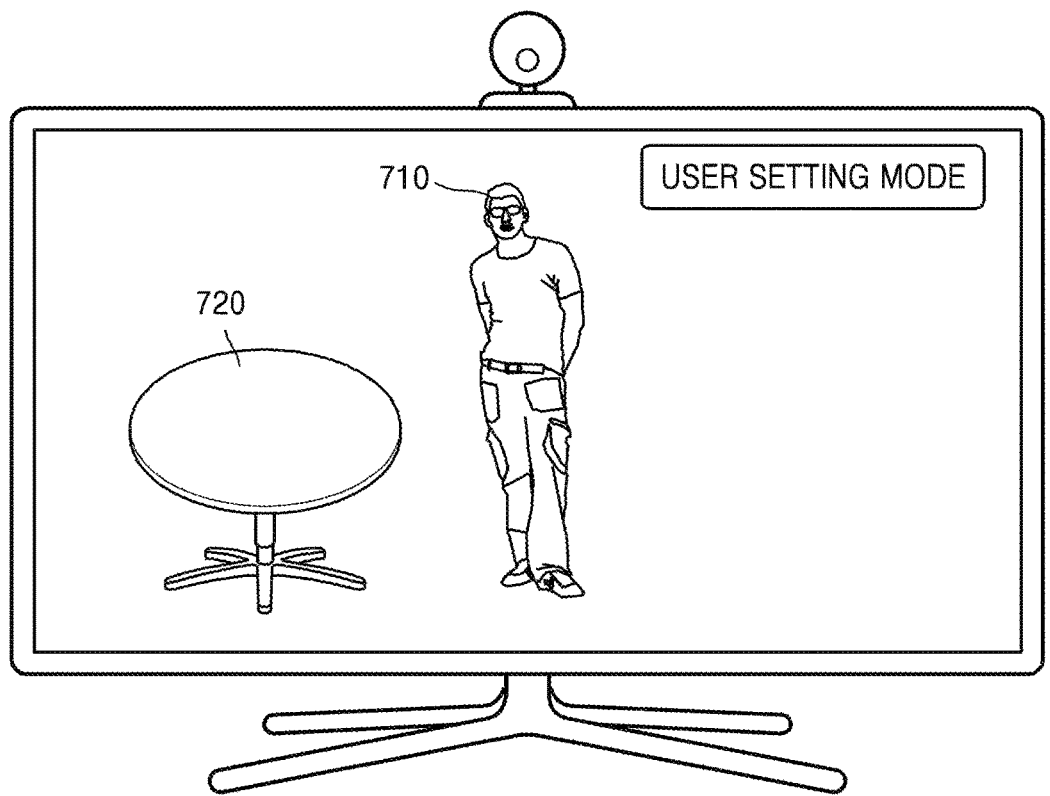

FIGS. 7A and 7B illustrate diagrams for explaining an example of deleting an object, the deleting being performed by a device, according to an embodiment of the present disclosure.

Referring to FIG. 7A, objects 710, 720, and 730 are shown on a screen of the device 100. It is assumed that the object 710, shown in FIG. 7A, is an object representing a user of content.

From among objects output to the screen, an object that is not necessary for the user to use content may be present. For example, if it is assumed that the content is a dancing game, from among the objects output to the screen, an object representing a subject having a low possibility of a collision with the user when the user is taking a motion may be present. Then, the user may delete the object representing the subject having a low possibility of a collision with the user.

For example, even though a table and a chair are present near the user, since a distance between the chair and the user is long, a possibility of a collision between the user and the chair may be very low even when the user takes a certain motion. In this case, the user may delete the object 730 representing the chair, via the input unit 2910.

FIG. 7B shows the object 710 representing the user and the object 720 which is not deleted by the user. The device 100 may not output the object 730, which is deleted based on information input by the user, to the screen.

Referring back to FIG. 2, in operation 220, the device 100 determines a first area, which includes points reachable by at least a part of the first subject, by using form information of the first subject. Additionally, in operation 230, the device 100 determines a second area, which includes points reachable by at least a part of the second subject, by using form information of the second subject.

For example, if it is assumed that an object is an image of a person, a part of a subject refers to a part of a body of a user such as a head, a trunk, an arm, or a leg of the user. Hereinafter, for convenience of description, an area, which includes the points reachable by at least a part of a subject, is defined as a 'range of motion'. For example, an area including all points that a person may reach by stretching his/her arms or legs may be referred to as a 'range of motion'.

As an example, a range of motion of a subject may be an area which includes points that a part of a user may reach while the user remains still in a designated area. As another example, a range of motion of a subject may be an area which includes points that a part of a user may reach while the user is moving along a certain path. As another example, a range of motion of a subject may be an area which includes points that a part of a user may reach as the user moves in a designated location.

An example in which a combination of points, which a part of a user may reach while the user remains still in a designated area, constitutes a range of motion of a subject is described later with reference to FIGS. 8 through 9B and FIGS. 11 through 16B.

Additionally, an example in which a combination of points, which a part of a user may reach as the user moves in a certain location, constitutes a range of motion of a subject is described later with reference to FIGS. 10A and 10B. Additionally, an example in which a combination of points, which a part of a user may reach while the user is moving along a certain path, constitutes a range of motion of the subject is described later with reference to FIGS. 17 and 18.

Figure 8:
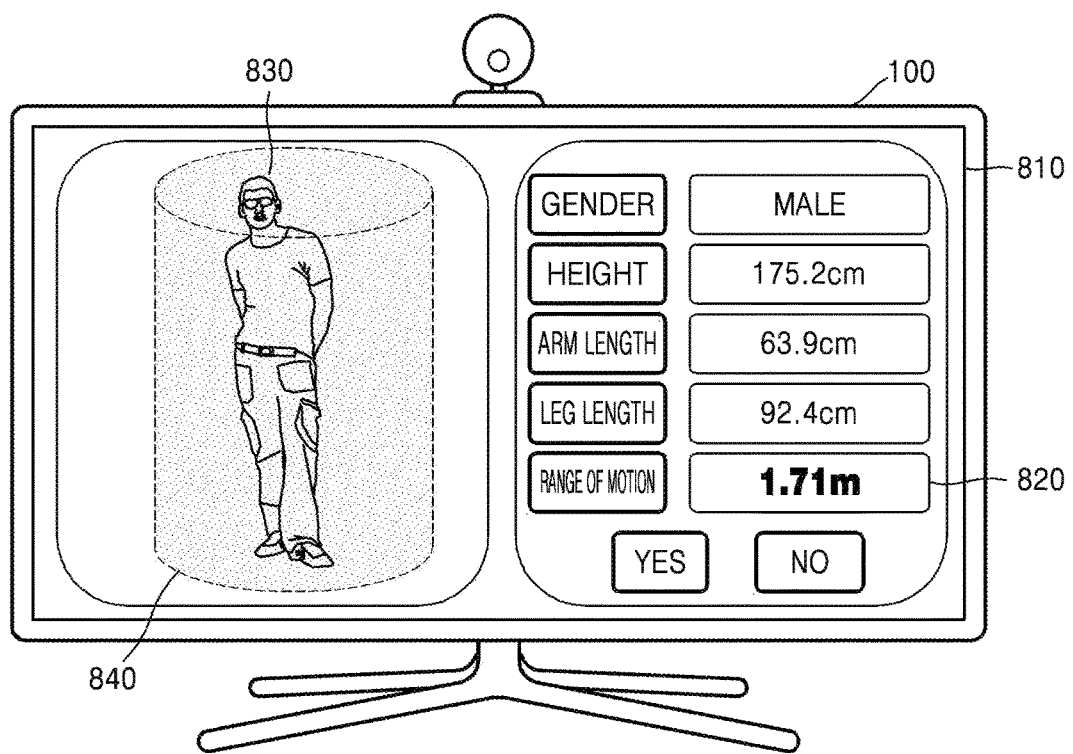
FIG. 8 illustrates a diagram showing an example of outputting a range of motion of a subject to the screen of a device, according to an embodiment of the present disclosure.

FIG. 8 illustrates a diagram showing an example of outputting a range of motion of a subject to a screen of a device according to an embodiment of the present disclosure Referring to FIG. 8, the device 100 determines a range of motion of a subject by using form information of the subject. The device 100 determines points reachable by a part of a user when the user remains still in a place, in consideration of values of lengths included in form information of the subject (for example, if the subject is assumed as the person, a height, an arm length, a leg length of a person, or the like), and determines a range of motion of the user by combining the determined points with each other.

As an example, the device 100 may determine a range of motion of a subject based on a mapping table stored in a storage unit (e.g., storage unit 2940). The mapping table refers to a table that shows a ratio between a range of motion and a size of the subject according to a type of the subject represented by the object (for example, if the subject is a person, a height, an arm length, or a leg length of the subject). For example, the mapping table may include information indicating that the radius of a range of motion of the person is equal to three-quarters of the length of an arm of the person or four-fifths of the length of a leg of the person. Additionally, the mapping table may include information about motions that may be taken by a user according to a type of content. For example, motions that may be taken by the user in a soccer game may be different from motions that may be taken by the user in a dancing game. Accordingly, a range of motion that may be determined when the user participates in the soccer game may be different from a range of motion that may be determined when the user participates in the dancing game. The mapping table may include information about motions that may be taken by the user according to a type of content, and store a size of a range of motion in which body sizes of the user are reflected, with respect to each motion. Accordingly, the device 100 may determine a range of motion variously according to a type of the content.

As another example, the device 100 may determine a range of motion based on a sum of values of lengths of parts of a subject. If it is assumed that an object is an image of a person, the device 100 may determine a length, corresponding to twice a length of an arm of the person, as a diameter of a range of motion.

The device 100 may output the range of motion determined by the device 100 to the screen 810. The range of motion output to the screen 810 may correspond to a diameter of a circle if the range of motion constitutes the circle, or a length of a side constituting a rectangle if the range of motion constitutes the rectangle. In other words, a user may determine the range of motion based on information 820 that is output to the screen 810. If an object 830 representing the user is output to the screen 810, the range of motion may be displayed as an image 840 near the object.

For example, the device 100 calculates a ratio between a range of motion and a length of the object 830. For example, if it is assumed that a height of a person corresponding to the object 830 is 175.2 cm and a range of motion of the person is 1.71 m, the device 100 calculates a ratio of the range of motion to the height of the person as 171/175.2=0.976. Additionally, the device 100 calculates a length of an image 840 that is to be displayed near the object 830, by using the calculated ratio and a value of a length of the object 830 which is displayed on the screen 810. For example, if it is assumed that the length of the object 830 displayed on the screen 810 is 5 cm, the device 100 calculates the length of the image 840 that is to be displayed near the object 830 as 0.976*5 cm=4.88 cm. The image 840 corresponding to the length calculated by the device 100 is displayed on the screen 810. For example, the shape of the image 840 may be circular with a diameter having a value of the length calculated by the device 100.

As described with reference to FIG. 8, the device 100 determines a range of motion of a subject (for example, a user) based on form information of the subject. The device 100 may determine a range of motion of the subject based on setting information input by the user. In this case, the form information obtained by the device 100 may not be taken into account in the determining of the range of motion of the subject.

Figure 9A:
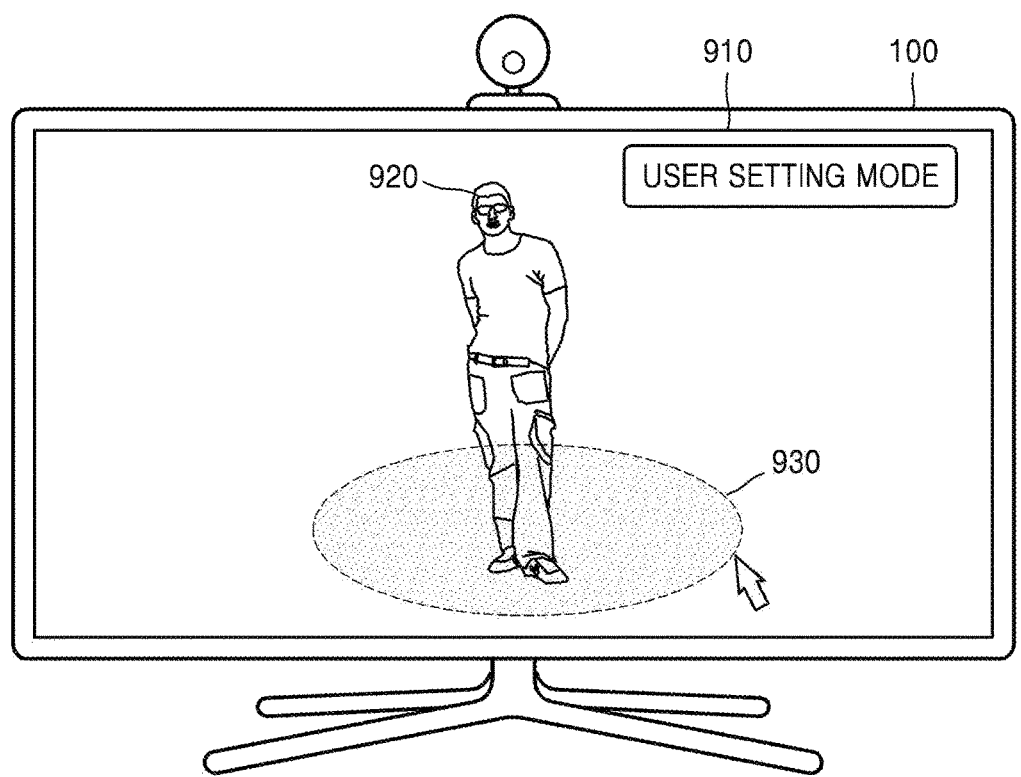
Figure 9B:
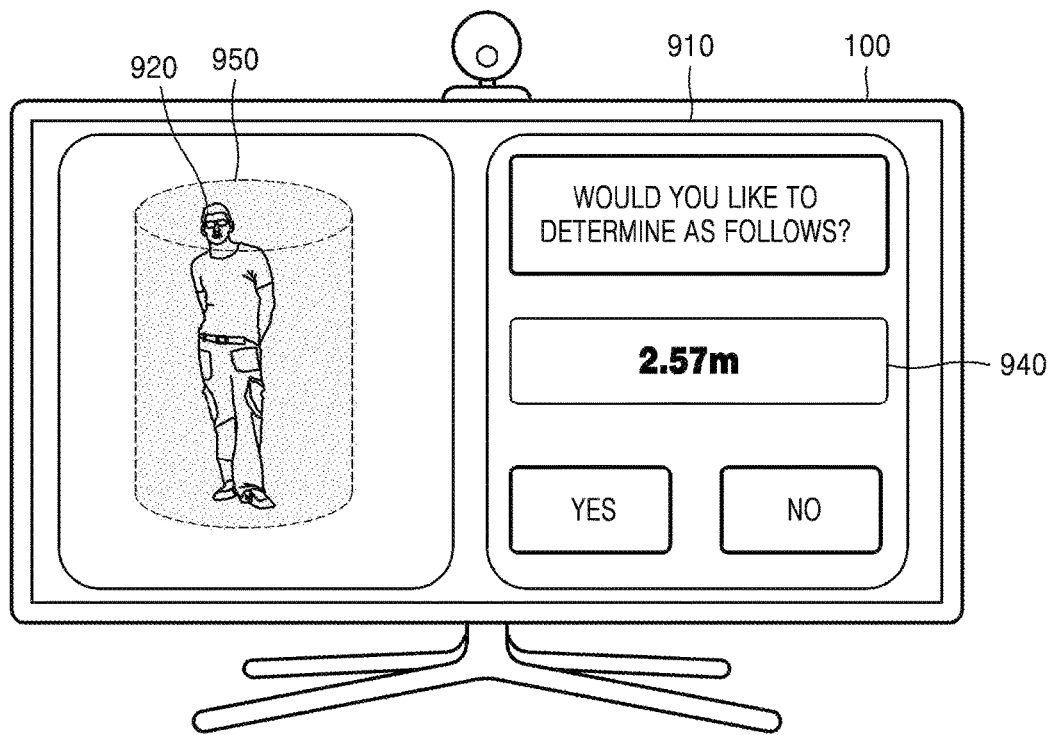

FIGS. 9A through 9C illustrate diagrams for explaining an example of determining a range of motion of a subject based on setting information input by a user, the determining being performed by a device, according to an embodiment of the present disclosure.

Referring to FIG. 9A, an object 920 is output to a screen 910 of the device 100. A user may transmit setting information for setting a range of motion to the device 100 via an input unit (e.g., an input unit 2910).

For example, the user may set a certain area 930 according to the object 920, which is output to the screen 910, via the input unit (e.g., an input unit 2910). The area 930 set by the user may be shown in the shape of a circle, a polygon, or a straight line with the object 920 at the center thereof. The device 100 may output the area 930 set by the user to the screen 910.

Referring to FIG. 9B, the device 100 may determine a range of motion of the subject based on the area 930 set by the user. For example, if it is assumed that the area 930 set by the user is circular, the device 100 may determine an area having a shape of a circular cylinder as a range of motion, wherein the circular cylinder has a bottom side having a shape of a circle set by the user and a length corresponding to a value obtained by multiplying a height of the user by a certain rate. The rate by which the height of the user is multiplied may be stored in a storage unit (e.g., a storage unit 2940) included in the device 100.

The device 100 may output the range of motion determined by the device to the screen 910. If the range of motion has a shape of a circle, a diameter of the circle may be output to the screen 910 as the range of motion. If the range of motion has a shape of a rectangle, a length of a side of the rectangle may be output to the screen 910 as the range of motion. In other words, information 940 through which the user may recognize a size of the range of motion may be output to the screen 910. If the object 920 is output to the screen 910, the range of motion may be displayed as an image 950 to include the object 920.

Referring to FIG. 9C, the device 100 may determine a range of motion of a user 960 so that a gesture of the user 960 is reflected in the range of motion. For example, when an object 971 representing the user 960 is output, the device 100 may request the user 960 to perform a certain gesture using a direction or instructions 980 displayed on a screen of the device 100.

The device 100 may output a first gesture 972 that is to be performed by the user 960 and output in real time an appearance 973 of the user 960 that is photographed by the camera 320 to the screen. Accordingly, the user 960 may check in real time whether the current shape of the user 960 is identical to the first gesture 972.

When the first gesture 972 of the user 960 is photographed, the device 100 calculates a range of motion of the user 960 in consideration of both form information of the user 960 (for example, a height, a length of an arm, a length of a leg of the user 960, or the like) and the gesture 973 of the user 960 together. For example, if it is assumed that a length of one leg of the user 960 is 1.5 m and a width of a chest of the user 960 is 0.72 m, the device 100 may calculate a range of motion of the user 960 corresponding to the first gesture 972 as 3.72 m, wherein the gesture 972 is performed when the user 960 spreads his/her arms widely.

The device 100 may output to the screen a value 991 of the calculated range of motion to the screen, and output the range of motion of the user 960 to include the object 971 as an image 974.

Here, a plurality of gestures that are to be performed by the user 960 may be selected according to details of content. For example, if the content is a dancing game, the device 100 may calculate a range of motion in advance with respect to each of the plurality of gestures that are to be performed while the user 960 enjoys the dancing game.

In other words, if a first range of motion 991 of the user 960 according to the first gesture 972 is determined, the device 100 outputs a second gesture 975 to the screen, and outputs in real time an appearance 977 of the user 960 which is photographed by the camera 320. Then, the device 100 calculates a range 992 of motion of the user 930 according to the second gesture 975. Then, the device 100 may output the range 992 of motion of the user 930 near the object as an image 976.

FIGS. 10A and 10B illustrate diagrams for explaining an example of determining a range of motion of a subject, the determining being performed by a device, according to an embodiment of the present disclosure.

Referring to FIG. 10A, an example is shown in which a left side of a range of motion 1020 is symmetrical to a right side of the range of motion 1020 with respect to a center of an object 1010. If it is assumed that the subject is a person, a range in which the person stretches his/her arm or leg while standing in a certain location may be a range of motion of the person. Accordingly, the device 100 may determine a circular cylinder, having a center at a trunk of the person, as the range 1020 of the motion.

Referring to FIG. 10B, an example is shown in which a left side of a range of motion 1040 is not symmetrical to a right side of the range of motion 1040 with respect to the center of an object 1030. If it is assumed that the subject is a person, movement of the person may not be symmetrical. For example, as shown in FIG. 10B, if the person moves one leg forward while the other leg remains in an original location, the left side of the person's body may not be symmetrical to the right side of the person's body with respect to the center of the person's body.

Accordingly, the device 100 may determine a range of motion of the subject based on a combination of the farthest points reachable by parts of the subject as the subject moves in a certain area.

As described with reference to FIGS. 8 through 10B, the device 100 may obtain form information of a subject and determine a range of motion of the subject by using the form information. Additionally, the device 100 may determine a range of motion of a subject based on a setting by a user. The device 100 may obtain form information of each of a plurality of subjects, and determine a range of motion with respect to each of the plurality of subjects.

Hereinafter, with reference to FIGS. 11 through 16B, examples of determining a range of motion with respect to each of a plurality of subjects, which is performed by a device, are described.

Figure 11:
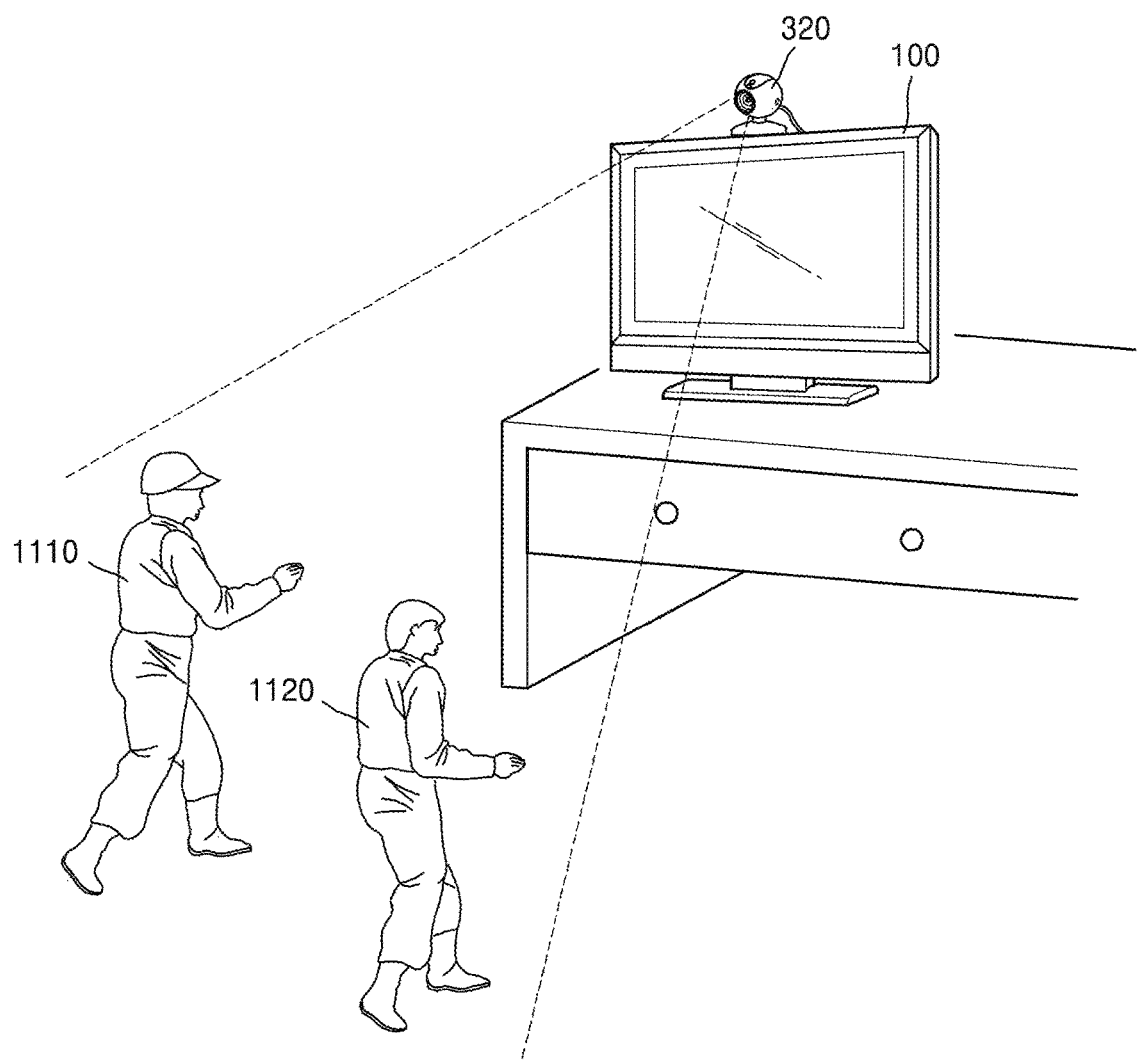
FIG. 11 illustrates a diagram for explaining an example of obtaining form information of a plurality of subjects, the obtaining being performed by a device, according to an embodiment of the present disclosure.

FIG. 11 illustrates a diagram for explaining an example of obtaining form information of a plurality of subjects, the obtaining being performed by a device, according to an embodiment of the present disclosure.

Referring to FIG. 11, an example of a plurality of users 1110 and 1120 is illustrated. For convenience of description, a total of two users 1110 and 1120 are shown in FIG. 11, but the plurality of users 1110 and 1120 are not limited thereto.

The device 110 obtains form information of each of the plurality of users 1110 and 1120. An example of obtaining form information of each of the plurality of users 1110 and 1120, which is performed by the device 100, is described with reference to FIGS. 3 through 4B. For example, the device 100 may obtain form information of each of the plurality of users 1110 and 1120 by using data corresponding to an image captured by the camera 320. The camera 320 may capture an image so that the image includes all of the plurality of users 1110 and 1120. The camera 320 may also capture a first image that includes a first user 1110, and then, capture a second image that includes a second user 1120.

Figure 12:
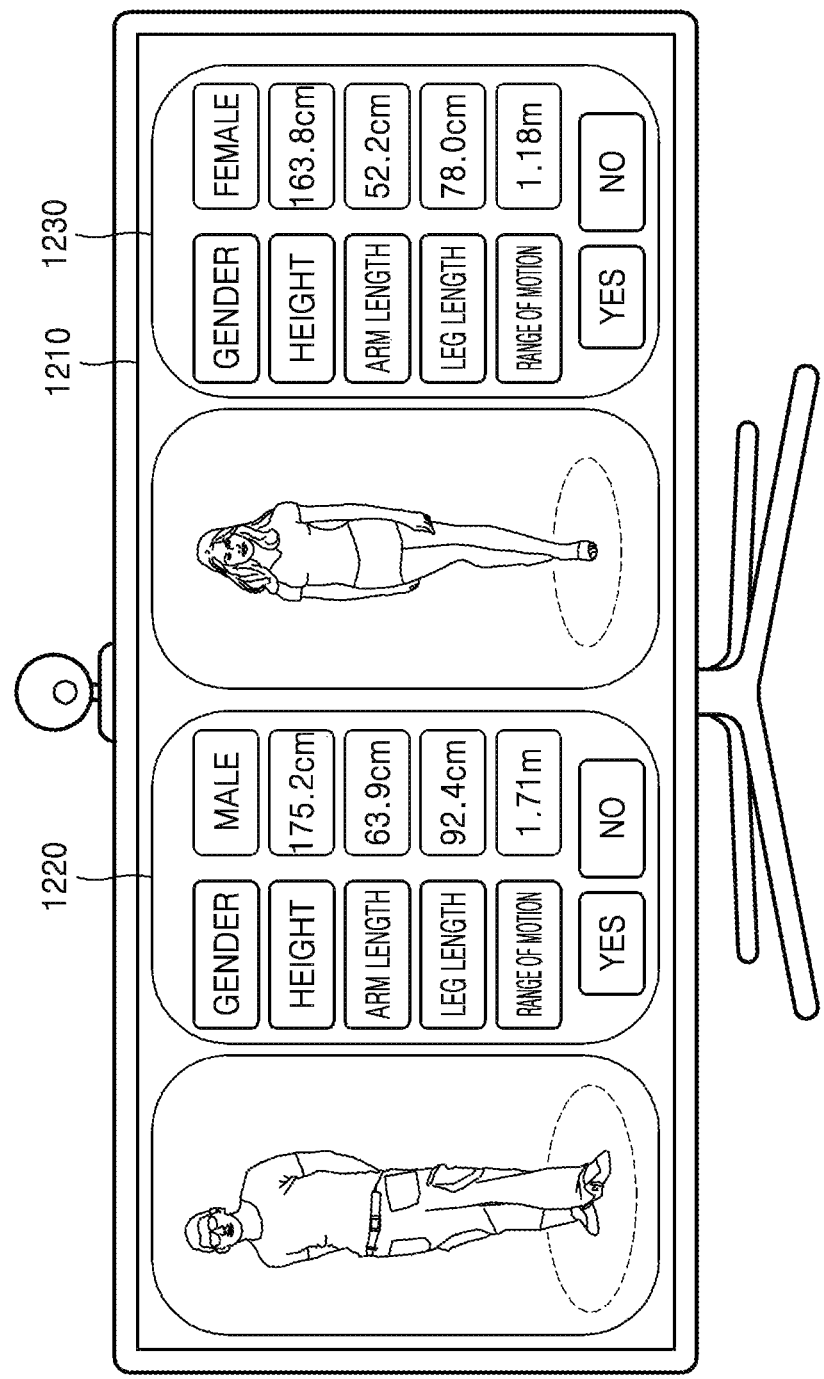
FIG. 12 illustrates a diagram showing an example of outputting form information and a range of motion of each of a plurality of users to a screen of a device, according to an embodiment of the present disclosure.

FIG. 12 illustrates a diagram showing an example of outputting form information and a range of motion of each of a plurality of users to a screen of a device 100 according to an embodiment of the present disclosure.

Referring to FIG. 12, form information and a range of motion 1230 of a second user as well as form information and a range of motion 1220 of a first user may be output to the screen 1210. An example of determining a range of motion of a first user and a range of motion of a second user, which is performed by the device 100, is described with reference to FIGS. 8 through 10. In FIG. 12, it is assumed that a total of two users are present. However, as described above, the number of users is not limited. Accordingly, form information and a range of motion output to the screen 1210 may be increased or decreased in correspondence with a number of users.

Additionally, FIG. 12 shows that the form information and the range of motion 1220 of the first user and the form information and the range of motion 1230 of the second user are output at the same time, but the outputting is not limited thereto. For example, the form information and the range of motion 1220 of the first user and the form information and the range of motion 1230 of the second user may be alternately output according to an elapse of time.

Figure 13A:
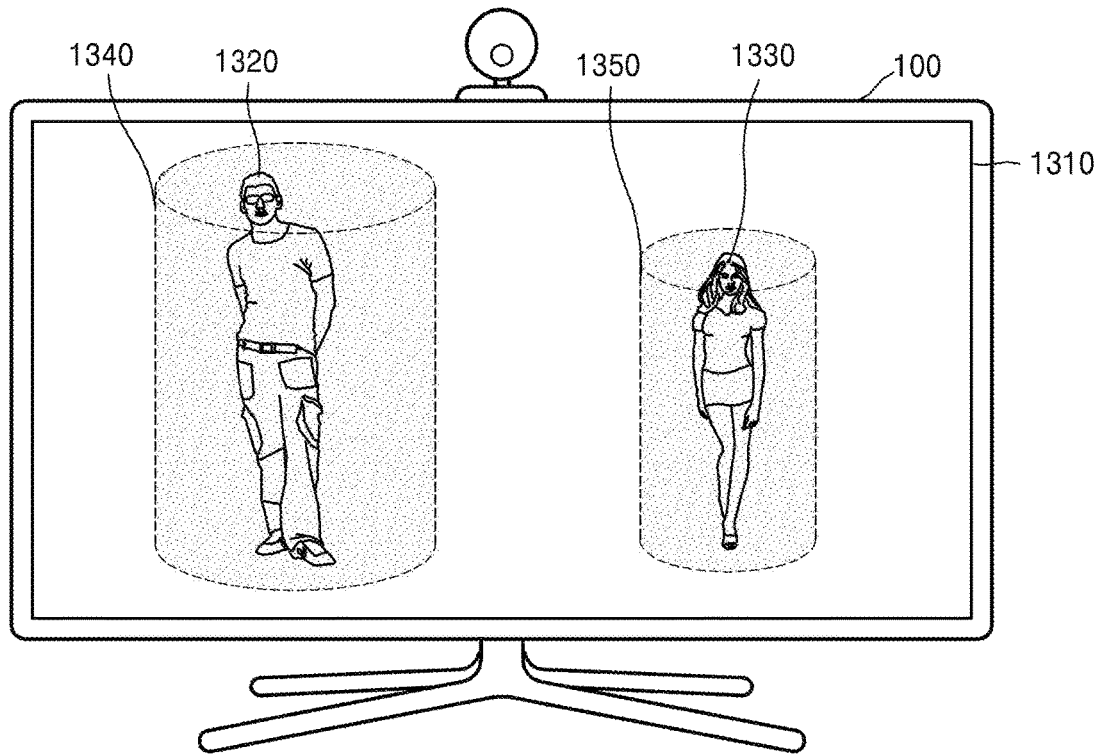
FIG. 13A illustrates a diagram showing an example of outputting a plurality of objects on the screen of a device, according to an embodiment of the present disclosure.

FIG. 13A illustrates a diagram showing an example of outputting a plurality of objects on a screen of a device according to an embodiment of the present disclosure.

Referring to FIG. 13A, the device 100 may output a plurality of objects 1320 and 1330 to a screen 1310. Accordingly, a point at which subjects respectively corresponding to each of the objects 1320 and 1330 are located currently may be checked in real time.

The device 100 may display ranges of motion 1340 and 1350 of each of the subjects together with the objects 1320 and 1330. Accordingly, it may be checked in real time whether or not ranges of motion of the subjects overlap with each other, based on a current location of the subjects.

If the ranges of motion 1340 and 1350 of the subjects overlap with each other, the device 100 may not execute content. For example, if the content is a computer game, the device 100 may not execute the computer game. Hereinafter, this is described in more detail with reference to FIG. 13B.

Figure 13B:
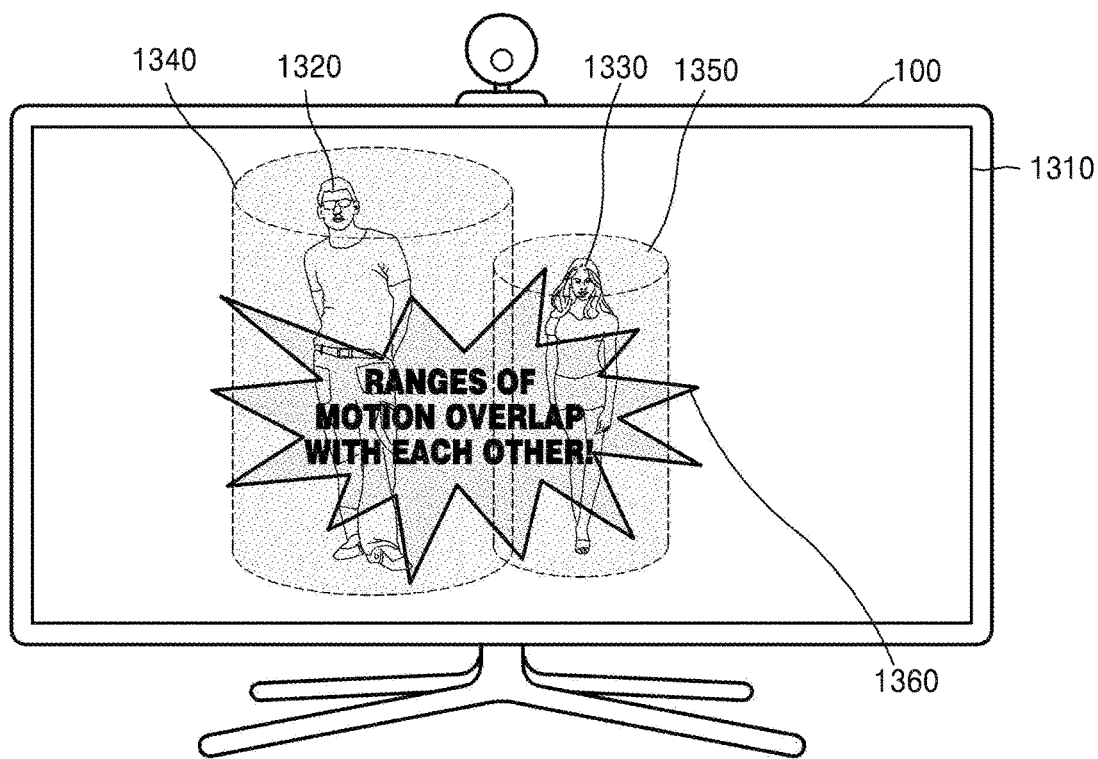
FIG. 13B illustrates a diagram showing an example in which a device does not execute content according to an embodiment of the present disclosure.

FIG. 13B illustrates a diagram showing an example in which a device does not execute content according to an embodiment of the present disclosure.

Referring to FIG. 13B, it is described that the objects 1320 and 1330 are images of users participating in a computer game. If the range of motion 1340 of a first user 1320 overlaps with the range of motion 1350 of a second user 1330, the device 100 may not execute the computer game.

For example, the device 100 may display an image 1360 or output a sound indicating that the range of motion 1340 overlaps with the range of motion 1350 on the screen 1310, and then, may not execute the computer game. As the first user 1320 or the second user 1330 moves, if the range of motion 1340 and the range of motion 1350 do not overlap with each other, the device 100 may execute the computer game thereafter.

Hereinafter, with reference to FIGS. 14A through 16B, examples of determining a range of motion of a user of content and a range of motion of a person, an animal, or a thing that does not use the content are described.

Figure 14A:
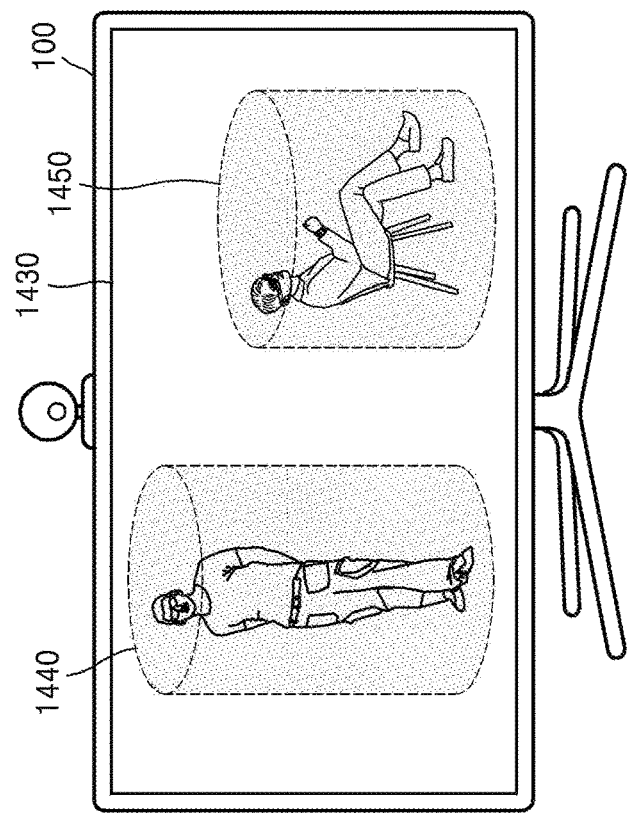
FIGS. 14A and 14B illustrate diagrams for explaining an example of obtaining form information of a plurality of subjects and determining a range of motion of the plurality of subjects, the obtaining and the determining being performed by a device, according to an embodiment of the present disclosure.
Figure 14B:
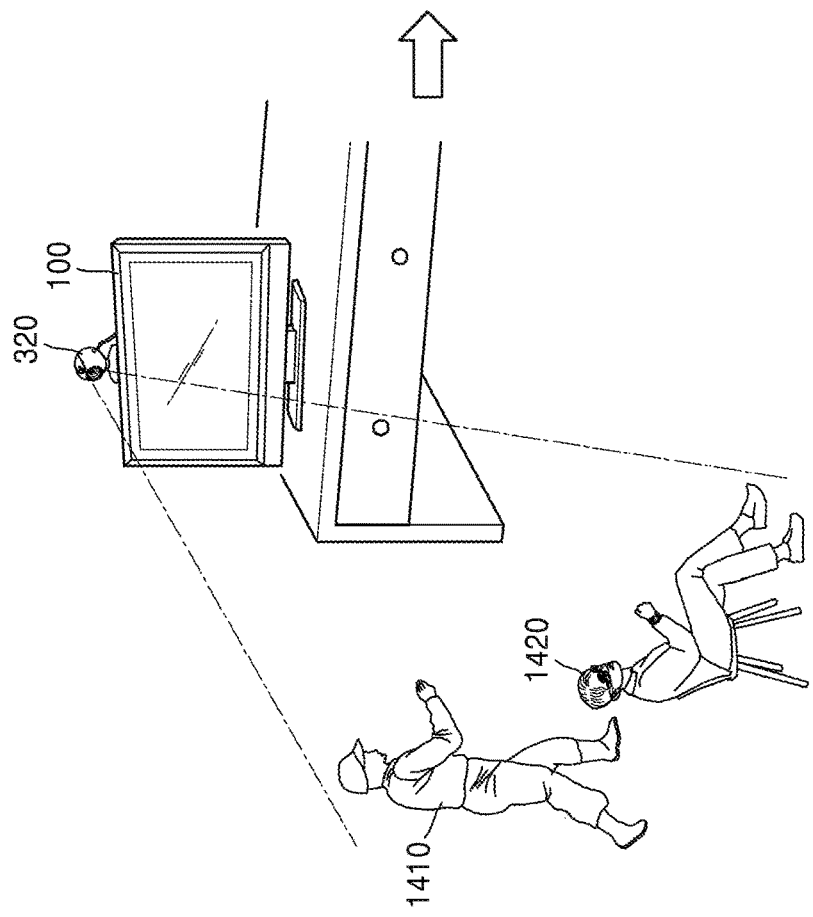

FIGS. 14A and 14B illustrate diagrams for explaining an example of obtaining form information of a plurality of subjects and determining a range of motion of the plurality of subjects, the obtaining and the determining being performed by a device, according to an embodiment of the present disclosure.

Referring to FIGS. 14A and 14B, the plurality of subjects 1410 and 1420, shown in FIG. 14A, respectively represent a user 1410 who uses the content and a non-user 1420 who does not use the content. The non-user 1420 may be present in an area near the user 1410. For example, if it is assumed that the content is a computer game, the user 1410 refers to a person who participates in the computer game, and the non-user 1420 refers to a person who does not participate in the computer game.

The device 100 obtains form information of the user 1410 and form information of the non-user 1420, and determines each range of motion of the user 1410 and the non-user 1420. As described above, the device 100 may obtain each form information of the user 1410 and the non-user 1420 via data transmitted from the camera 320.

FIG. 14B shows each form of the user 1410 and the non-user 1420 output to a screen 1430 of the device 100. The device 100 may display the respective ranges of motion 1440 and 1450 of the user 1410 and the non-user 1420 together with an object representing the user 1410 and an object representing the non-user 1420. Accordingly, it may be checked in real time whether ranges of motion of the user 1410 and the non-user 1420 overlap with each other, based on a current location of the user 1410 and the non-user 1420.

FIGS. 15A and 15B illustrate diagrams for explaining another example of obtaining form information of a plurality of subjects and determining a range of motion of the plurality of subjects, the obtaining and the determining being performed by a device, according to an embodiment of the present disclosure.

Referring to FIGS. 15A and 15B, a plurality of objects 1510 and 1520 respectively represent a user 1510 of content and an animal 1520.

The device 100 obtains respective form information of the user 1510 and the animal 1520, and calculates a range of motion. As described above, the device 100 may obtain respective form information of the user 1510 and the animal 1520 by using the camera 320.

FIG. 15B shows each form of the user 1510 and the animal 1520 output to a screen 1530 of the device 100. The device 100 may display respective ranges of motion 1540 and 1550 of the user 1510 and the animal 1520 together with an object representing the user 1510 and an object representing the animal 1520.

Figure 16A:
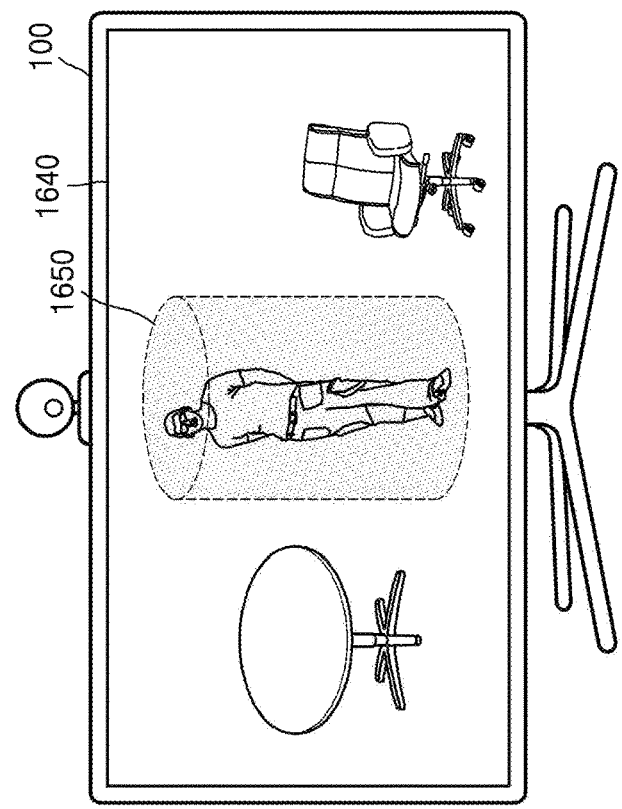
FIGS. 16A and 16B illustrate diagrams for explaining an example of obtaining form information of a plurality of subjects and determining a range of motion of the plurality of subjects, the obtaining and the determining being performed by the device according to an embodiment of the present disclosure.
Figure 16B:
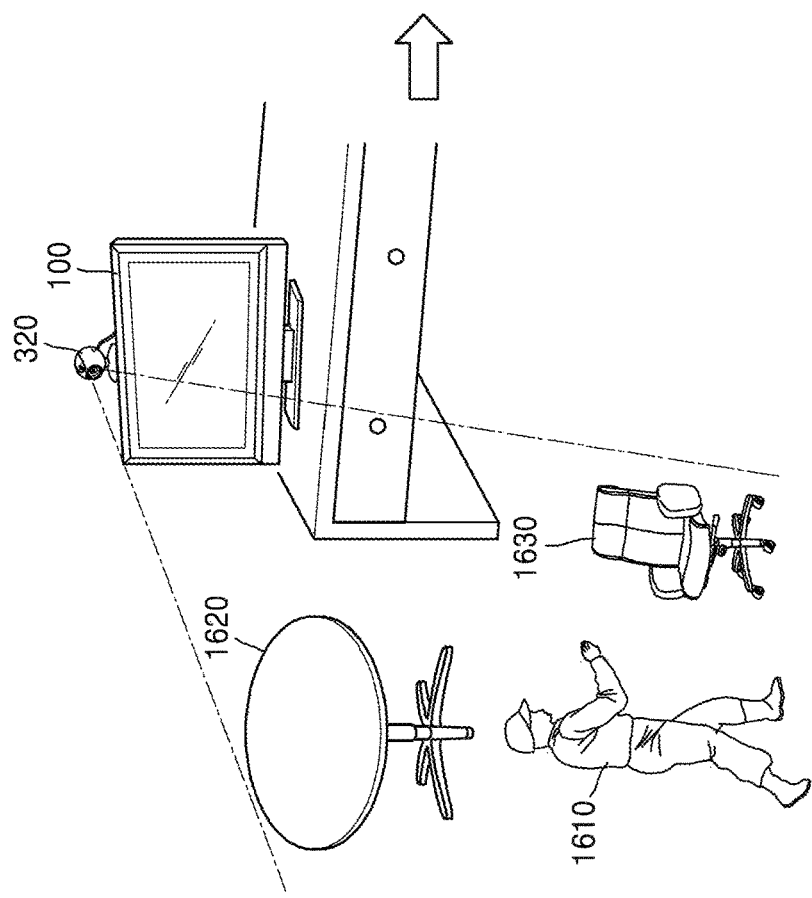

FIGS. 16A and 16B illustrate diagrams for explaining an example of obtaining form information of a plurality of subjects and determining a range of motion of the plurality of subjects, the obtaining and the determining being performed by device, according to an embodiment of the present disclosure.

Referring to FIGS. 16A and 16B, the plurality of subjects 1610, 1620 and 1630 respectively refer to a user 1610 of content and things 1620 and 1630. In FIG. 16A, the things 1620 and 1630 are illustrated as an obstacle which is present in an area near the user 1610, such as furniture.

The device 100 obtains respective form information of the user 1610 and the obstacle 1620 or 1630, and calculates a range of motion. As described above, the device 100 may obtain respective form information of the user 1610 and the obstacle 1620 or 1630 by using the camera 320.

FIG. 16B shows each form of the user 1610 and the obstacle 1620 or 1630 output to a screen 1640 of the device 100. The device 100 may display a range of motion 1650 of the user 1610, from among the user 1610 and the obstacle 1620 or 1630, together with an object representing the user 1610 an object representing the obstacle 1620 or 1630.

Figure 17:
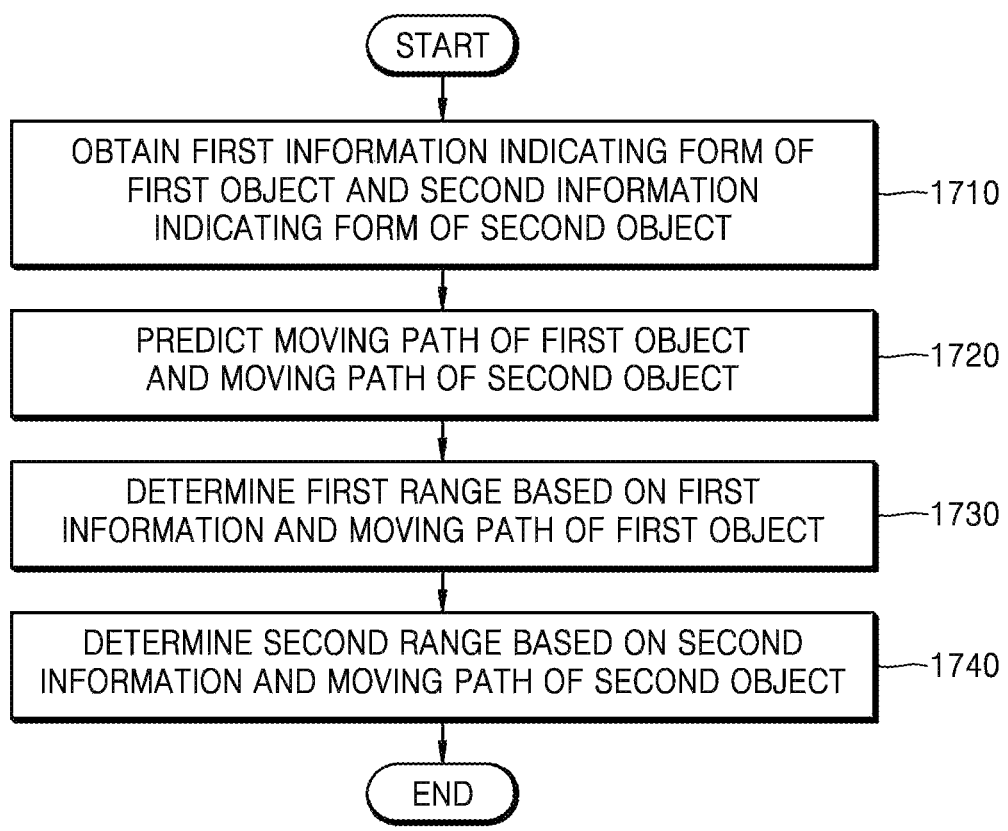
FIG. 17 illustrates a flowchart illustrating an example of obtaining form information of a subject and determining a range of motion of the subject, the obtaining and the determining being performed by a device according to an embodiment of the present disclosure.

FIG. 17 illustrates a flowchart illustrating an example of obtaining form information of a subject and determining a range of motion of the subject, the obtaining and the determining being performed by a device, according to an embodiment of the present disclosure.

Referring to FIG. 17, operations are processed in time series by the device 100 or the apparatus 101 for executing content as shown in FIG. 29 or 31. Accordingly, it will be understood that the descriptions provided with reference to FIGS. 1 through 16 may also be applied to the operations described with reference to FIG. 17, even if the descriptions are not provided here again.

Additionally, operation 1710 described with reference to FIG. 17 is substantially identical to operation 210 described with reference to FIG. 1. Accordingly, a detailed description with regard to operation 1710 is not provided here.

In operation 1720, the device 100 predicts a moving path of a first subject and a moving path of a second subject.

The first subject and the second subject may be users of content, and the content may be a game that requires a motion and moving of a user. For example, if it is assumed that the content is a dancing game or a fight game, there may be cases when the user may have to move at a same place or to another place according to an instruction made by details of the content.

The device 100 analyzes the details of content, and predicts the moving path of the first object and the moving path of the second object based on the analyzed details of the content. For example, the device 100 may analyze the details of the content by reading the details of the content stored in a storage unit (e.g., storage unit 2940). Accordingly, the device 100 may prevent a collision between the subjects regardless of a type of content used by the user.

If the first subject is a user of the content, and the second subject is a non-user of the content, the device 100 predicts only a moving path of the user. In other words, the device 100 does not predict a moving path of the non-user. The first subject may be set as a user, and the second subject may be set as a non-user in advance before the content is executed. Accordingly, the device 100 may determine which subject is a user, from among the first and second subjects.

In operation 1730, the device 100 determines a first area based on form information and the moving path of the first subject. In other words, the device 100 determines a range of motion of the first subject, based on form information and the moving path of the first subject.

In operation 1740, the device 100 determines a second area based on second information and a moving path of the second object. In other words, the device 100 determines a range of motion of the second subject, based on form information and the moving path of the second subject. If the second subject is a non-user of the content, the device 100 may determine a range of motion of the second subject by using only the form information of the second subject.

Hereinafter, with reference to FIG. 18, an example of determining a range of motion of a subject based on form information and a moving path of the subject, which is performed by a device, is described.

Figure 18:
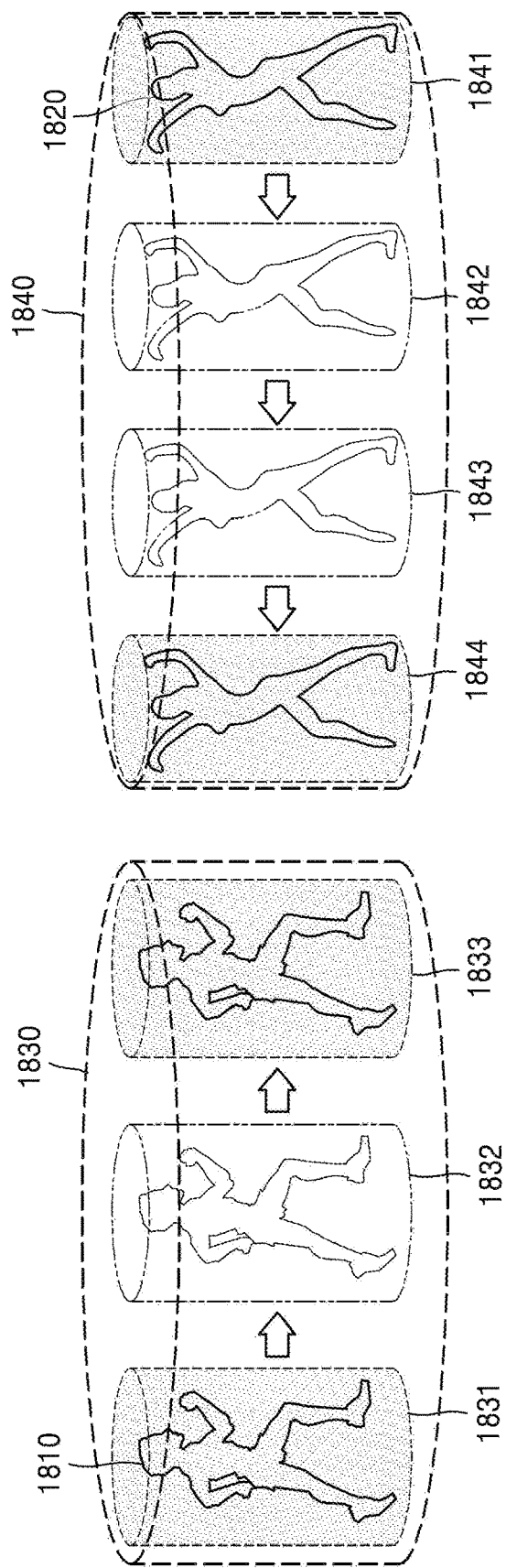
FIG. 18 illustrates a diagram for explaining an example of determining a range of motion of a subject based on form information and a moving path of the subject, the determining being performed by a device according to an embodiment of the present disclosure.

FIG. 18 illustrates a diagram for explaining an example of determining a range of motion of a subject based on form information and a moving path of the subject, the determining being performed by a device, according to an embodiment of the present disclosure.

Referring to FIG. 18, a first user 1810 moving from a left to right direction and a second user 1820 moving from a right to left direction are shown.

The device 100 may determine a range of motion 1831 of the first user 1810 in an initial location of the first user 1810, based on form information of the first user 1810. In other words, the device 100 may determine the range of motion 1831 of the first user 1810 when the first 1810 remains still in the initial location.

There may be cases when a user may have to move in a particular direction according to details of content executed by the device 100. There may also be cases when a user may have to take a particular motion while the user is moving, according to the details of the content. If it is assumed that the first user 1810 has to take a particular motion while moving from left to right, the device 100 determines ranges of motions 1832 and 1833 in each location of the first user 1810 which is included in a path in which the first user 1810 moves.

The device 100 may determine a final range of motion 1830 of the first user 1810, by combining all the determined ranges of motion 1831 through 1833.

The device 100 may determine a range of motion of the second user 1820 by using a same method as the method of determining a range of motion of the first user 1810. In other words, the device 100 determines a range of motion 1841 in an initial location of the second user 1820, and determines ranges of motion 1842 through 1844 in each location of the second user 1820 which is included in the moving path of the second user 1820. Additionally, the device 100 may determine a final range of motion 1840 of the second user 1820, by combining the determined ranges of motion 1841 through 1844.

The device 100 may determine the ranges of motion 1831 through 1833 and the ranges of motion 1841 through 1844, in consideration of motions that are to be taken by the users 1810 and 1820 while the users 1810 and 1820 are moving. For example, the device 100 may calculate a range of motion by using a mapping table stored in a storage unit (e.g., storage unit 2940). The mapping table includes information about a range of motion that is necessary in addition to a range of motion determined by using form information of the users 1810 and 1820, according to a type of motion required by content. For example, if a motion required by the content is a motion in which a user stretches an arm while taking a step with one foot, the mapping table may include information indicating that a range of motion amounting to 1.7 times the range of motion, which is determined by using the form information of the users 1810 and 1820, is additionally required.

In FIG. 18, an example in which the users 1810 and 1820 move in a two-dimensional (2D) space is described, but a space in which an user moved is not limited thereto. In other words, there may be a case when the users 1810 and 1820 may have to move in a 3D space according to details of content. Accordingly, even when the users 1810 and 1820 are to move in a 3D space, the device 100 may determine a range of motion of each of the users 1810 and 1820 according to the method described with reference to FIG. 18.

Referring back to FIG. 2, in operation 240, the device 100 predicts whether the first subject and the second subject are to collide with each other, based on whether the first range and the second range overlap with each other. In other words, the device 100 predicts whether the first and second subjects are to collide with each other, based on whether a range of motion of the first subject overlaps with a range of motion of the second subject. The predicting of whether the first and second subjects are to collide with other refers to predicting of a possibility of a collision between the first and second subjects when the first and second subjects do not collide with each other. For example, if a difference between a range of motion of the first subject and a range of motion of the second subject has a value less than a certain value, the device 100 may determine that the first subject and the second subject are to collide with each other.

Hereinafter, with reference to FIG. 19, an example of predicting whether a first subject is to collide with a second subject, which is performed by a device, is described.

Figure 19:
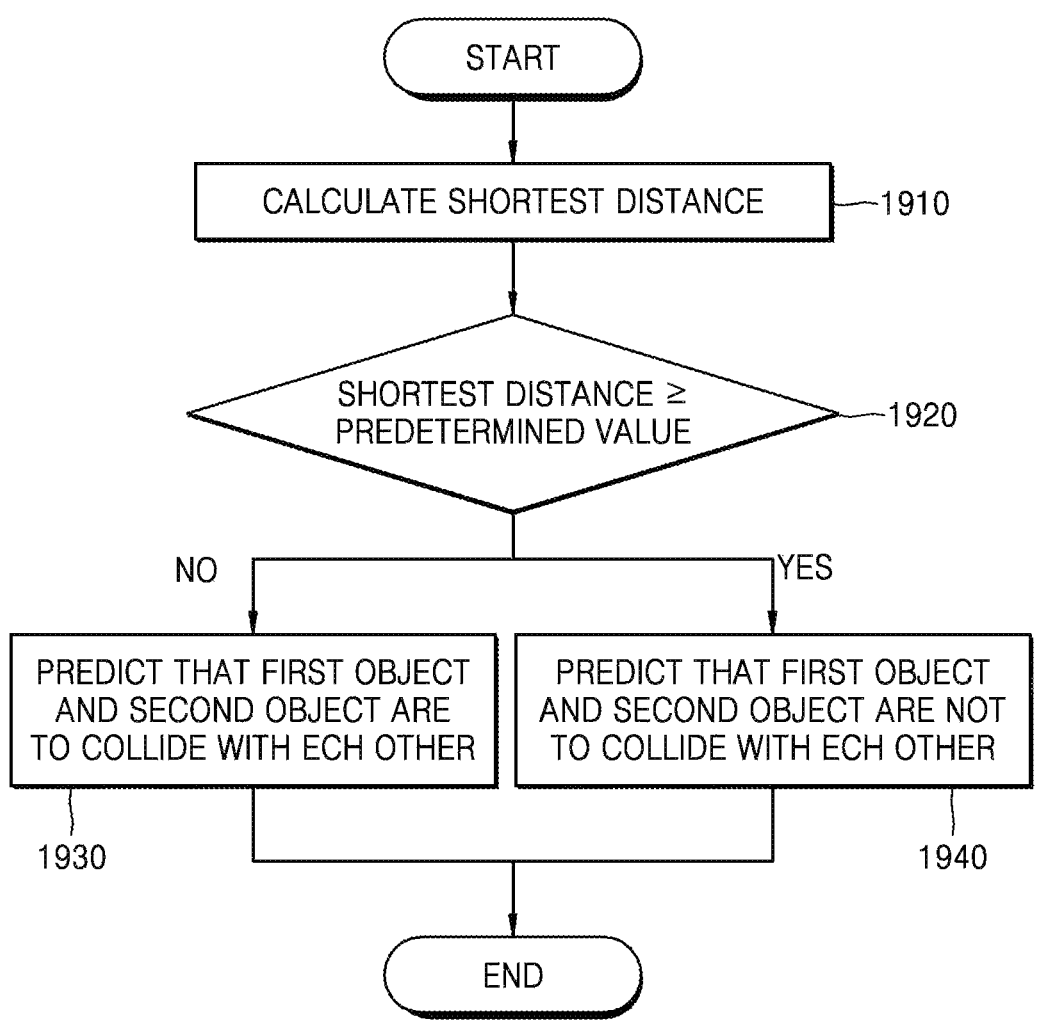
FIG. 19 illustrates a flowchart for explaining an example of predicting whether a first subject and a second subject are to collide with each other, the predicting being performed by a device according to an embodiment of the present disclosure.

FIG. 19 illustrates a flowchart for explaining an example of predicting whether a first subject and a second subject are to collide with each other, the predicting being performed by a device 100, according to an embodiment of the present disclosure.

Referring to FIG. 19, operations are processed in time series by the device 100 or the apparatus 101 for executing content as shown in FIG. 29 or 31. Accordingly, it will be understood that the description provided with reference to FIG. 1 may also be applied to the operations described with reference to FIG. 19, even if the descriptions are not provided here again.

In operation 1910, the device 100 calculates a shortest distance between the first subject and the second subject. The shortest distance is calculated in consideration of a range of motion of the first subject and a range of motion of the second subject. In more detail, the device 1000 selects a first point that is nearest the second subject, from among points included in the range of motion of the first subject. Additionally, the device 100 selects a second point that is nearest the first subject, from among points included in the range of motion of the second subject. Additionally, the device 100 calculates a distance between the first point and the second point, and determines the calculated distance as the shortest distance between the first subject and the second subject.

In operation 1920, the device 100 determines whether the shortest distance is greater than a predetermined distance value. The certain distance value may be a value pre-stored in a storage unit (e.g., storage unit 2940) or a value input by a user.

Hereinafter, with reference to FIGS. 20A through 20C, an example of comparing a shortest distance to a predetermined distance value, which is performed by a device, is described.

FIGS. 20A through 20C illustrate diagrams for explaining an example of comparing a shortest distance between subjects to a predetermined distance value, the comparing being performed by a device, according to an embodiment of the present disclosure.

Referring to FIG. 20A, an example in which a range of motion 2010 of a first user and a range of motion 2020 of a second user overlap with each other is illustrated. In other words, the range of motion 2010 of the first user includes the range of motion 2020 of the second user.

In this case, a shortest distance between the first user and the second user, which is calculated by the device 100, has a value of 0. In other words, the case when the shortest distance has a value of 0 includes a case when the range of motion 2010 of the first user overlaps with the range of motion 2020 of the second user, as well as a case when the range of motion 2010 of the first user contacts the range of motion 2020 of the second user at one point.

Accordingly, if the shortest distance between the first user and the second user has a value of 0, the device 100 determines that a value of the shortest distance is less than the predetermined distance value.

Referring to FIG. 20B, a diagram showing a case when a shortest distance between users has a value of m is illustrated. Here, a predetermined distance value k is assumed as a value greater than m.

A range of motion 2030 of a first user and a range of motion 2040 of a second user do not overlap with each other, nor contact each other at one point. The device 100 selects a first point that is nearest the second user, from among points included in the range of motion 2030 of the first user, and a second point that is nearest the first user, from among points included in the range of motion 2040 of the second user. Then, the device 100 determines a distance from the first point to the second point as a shortest distance m between the first user and the second user.

Since the shortest distance m is less than the predetermined distance value k, the device 100 performs operation 1930 shown in FIG. 19.

Referring to FIG. 20C, a diagram showing a case when a shortest distance between users has a value of n is illustrated. Here, a predetermined distance value k is assumed to be a value less than n.

A range of motion 2050 of a first user and a range of motion 2060 of a second user do not overlap with each other, nor contact each other at one point. The device 100 selects a first point that is nearest the second user, from among points included in the range of motion 2050 of the first user, and a second point that is nearest the first user, from among points included in the range of motion 2060 of the second user. Then, the device 100 determines a distance from the first point to the second point as a shortest distance n between the first user and the second user.

Since the shortest distance n is greater than the predetermined distance value k, the device 100 performs operation 1940 shown in FIG. 19.

Referring back to FIG. 19, if the shortest distance is greater than the predetermined distance value k, the device 100 determines that the first subject and the second subject are not to collide with each other in operation 1940. Here, a situation in which the first subject and the second subject are not to collide with each other includes a situation in which there is no possibility that the first subject and the second subject may collide with each other if the first subject or the second subject takes a different motion from a current motion. Additionally, if the shortest distance is less than the predetermined distance value k, the device 100 determines that the first subject and the second subject are to collide with each other in operation 1930. In this case, a situation in which the first subject and the second subject are to collide with each other includes a situation in which there is such a possibility that the first subject and the second subject may collide with each other even if the first subject or the second subject takes a motion different from a current motion.

Figure 21A:
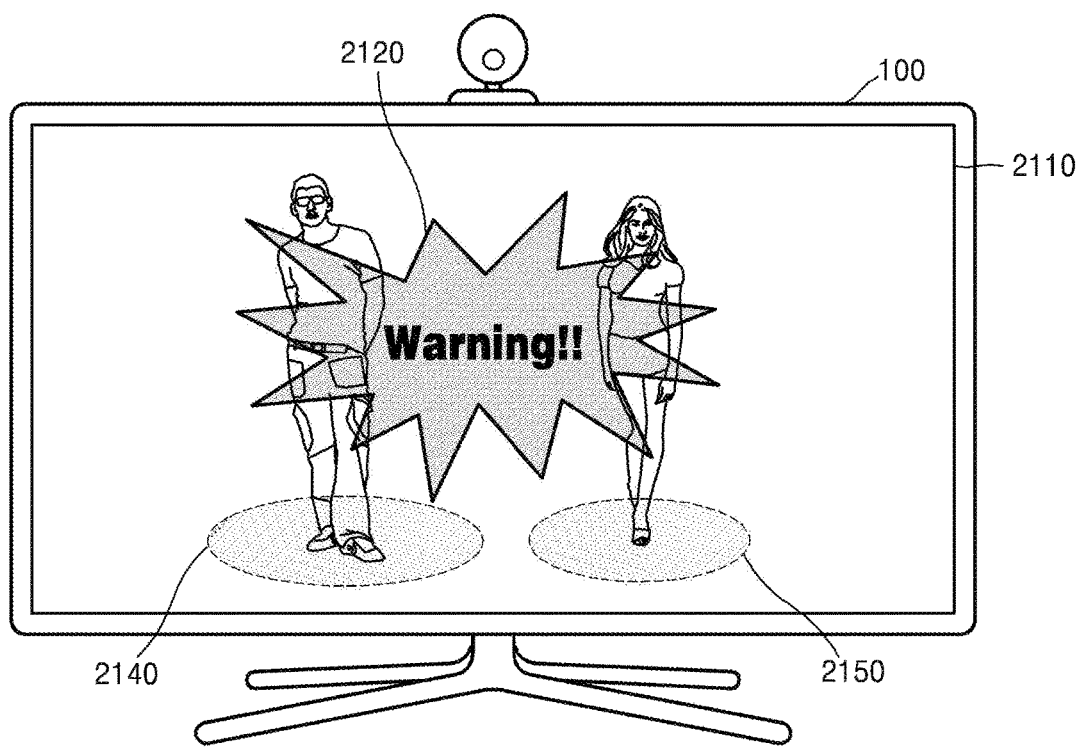
FIGS. 21A, 21B, and 21C illustrate diagrams showing an example of an image output to a screen of a device, if the device determines that subjects are to collide with each other according to an embodiment of the present disclosure.
Figure 21B:
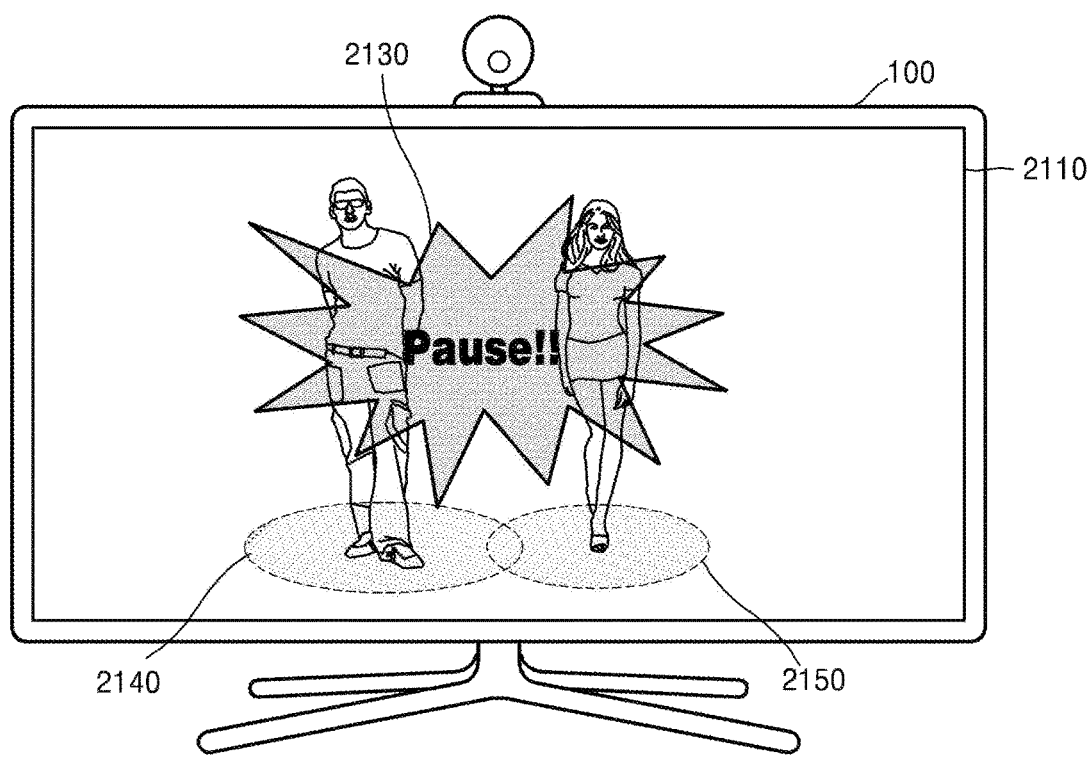
Figure 21C:
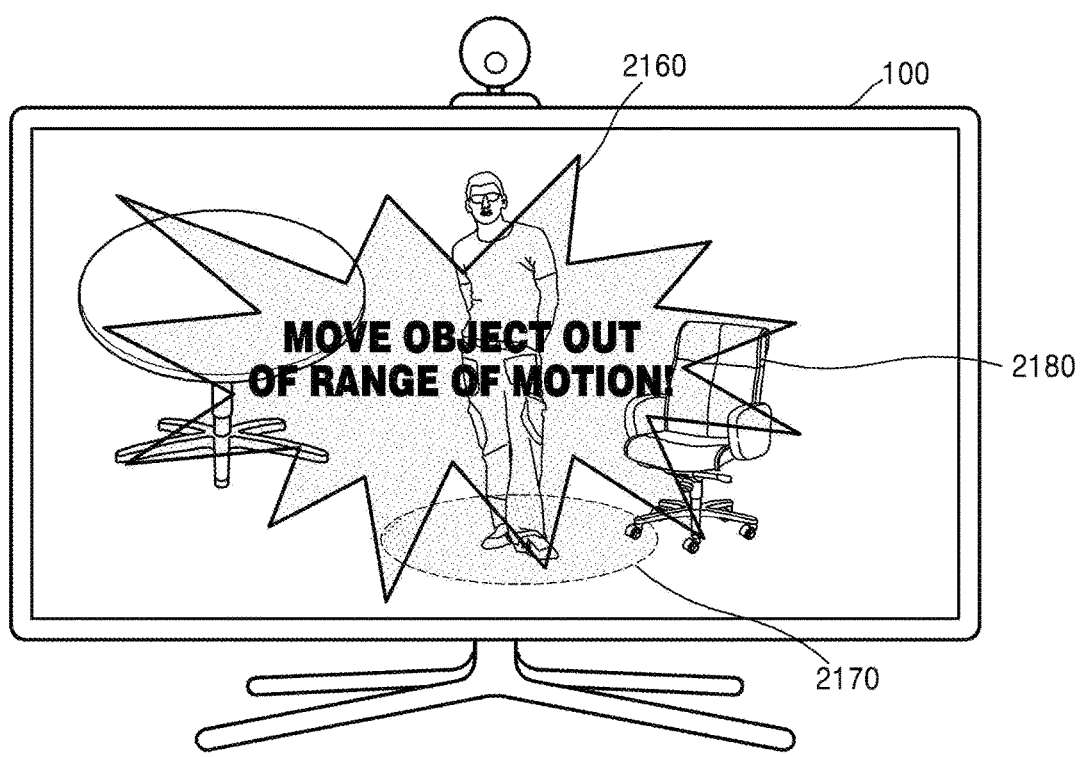

FIGS. 21A through 21C illustrate diagrams showing an example of an image output to a screen of a device, if the device determines that subjects are to collide with each other according to an embodiment of the present disclosure.

FIGS. 21A and 21B show an example of outputting dynamic objects (for example, images representing users) to a screen 2110. FIG. 21C shows an example of outputting a dynamic object (for example, an image representing a user) and static objects (for example, an images representing furniture) to a screen.

Referring to FIGS. 21A through 21C, if it is predicted that subjects are to collide with each other, the device 100 may output warning information indicating that the subjects are to collide with each other. The warning information may be light, a color, or a certain image output from a screen of the device 100, or sound output from a speaker included in the device 100. Additionally, if the device 100 is executing content, the device 100 may pause the executing of the content as an example of the warning information.

For example, the device 100 may output images 2120 and 2130 indicating the warning information to the screen 2110. As an example, referring to FIG. 21A, the device 100 may request a user to move to a place that is far away from another user, by outputting the image 2120 indicating a high possibility of a collision between users. Even though a range of motion 2140 of a first user and a range of motion 2150 of a second user do not overlap with each other, if a shortest distance between the range of motion 2140 and the range of motion 2150 has a value less than a predetermined distance value k, the device 100 may output the image 2120 indicating the high possibility of the collision between the first and second users.

As another example, referring to FIG. 21B, the device 100 may pause execution of content that is currently executed, while outputting the image 2130 indicating a very high possibility of a collision between users at a same time. If the range of motion 2140 of the first user and the range of motion 2150 of the second user overlap with each other, the device 100 may pause execution of the content that is currently executed, while outputting the image 2130 at a same time.

Referring to FIG. 21C, if a chair 2180 is located in a range of motion 2170 of a user, the device 100 may output an image 2160 requesting to move the chair 2180 out of the range of motion 2170 of the user.

After the executing of the content is paused, if ranges of motion of subjects become far away from each other so that a value of a distance therebetween is greater than a predetermined value, the device 100 re-executes the content. Hereinafter, with reference to FIG. 21D, an example of resuming execution of content after execution of the content is paused, the resuming being performed by a device, is described.

Figure 21D:
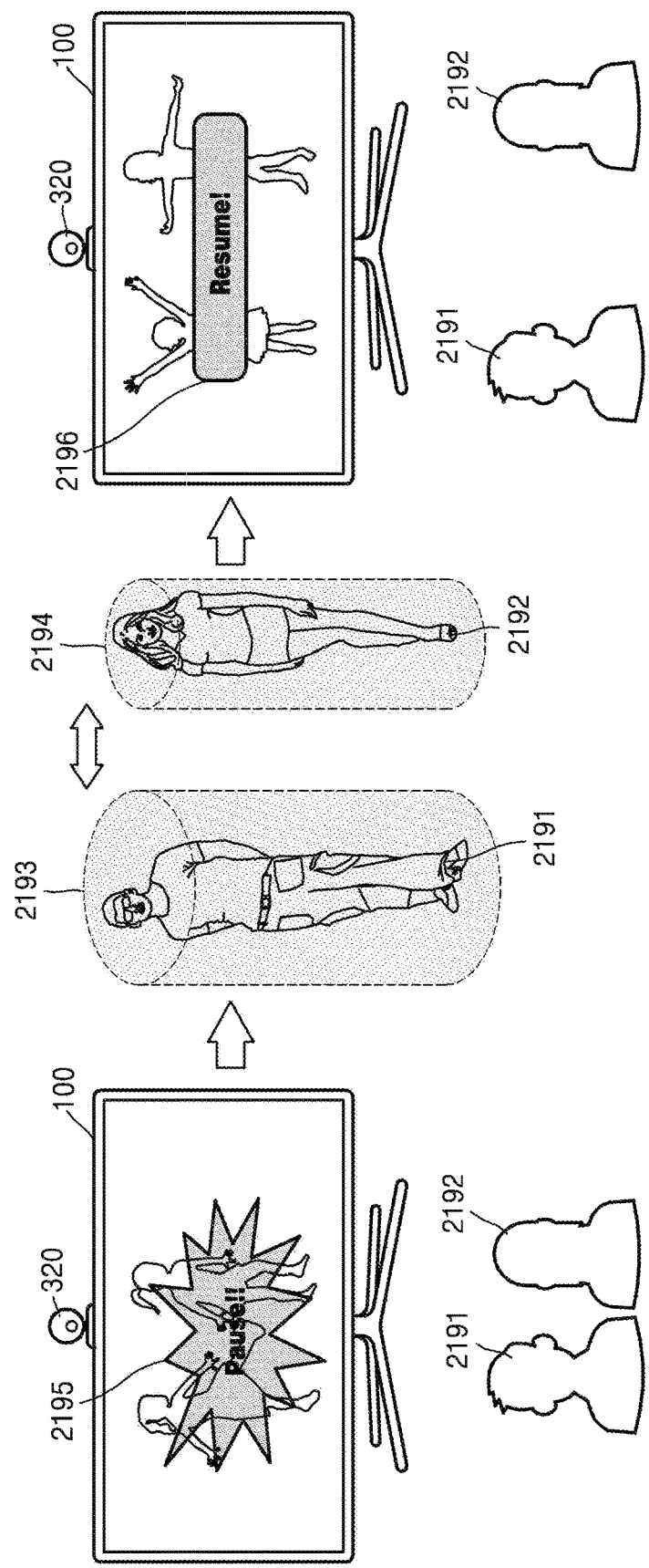
FIG. 21D illustrates a diagram showing an example of resuming execution of content after execution of the content is paused, the resuming being performed by a device according to an embodiment of the present disclosure.

FIG. 21D illustrates a diagram showing an example of resuming execution of content after execution of the content is paused, the resuming being performed by a device, according to an embodiment of the present disclosure.

Referring to FIG. 21D, when content is executed, if it is predicted that a first user 2191 and a second user 2192 are to collide with each other, the device 100 may pause the execution of the content, and output an image 2195 indicating that the first user 2191 and the second user 2192 are to collide with each other. Even when the execution of the content is paused, the camera 320 continuously photographs the first user 2191 and the second user 2192. Accordingly, the device 100 may check whether a distance between the first user 2191 and the second user 2192 is increased or decreased after the execution of the content is paused.

After the execution of the content is paused, if the first user 2191 and/or the second user 2191 moves from a current position, a distance therebetween may be increased. In other words, the first user 2191 may move in such a direction that the first user 2191 becomes far away from the second user 2192 or the second user 2192 may move in such a direction that the second user 2192 becomes far away from the first user 2191. As at least one from the group consisting of the first and second users 2191 and 2192 moves, if a value of a distance between a range of motion 2193 of the first user 2191 and a range of motion 2194 of the second 2192 becomes greater than a predetermined value, the device 100 may resume the execution of the content. In other words, as at least one of the first and second users 2191 and 2192 moves, if it is determined that there is no such possibility that the users 2191 and 2192 are to collide with each other, the device 100 may resume the execution of the content. In this case, the device 100 may output an image 2196 indicating that the execution of the content is resumed to the screen.

As described above, the device 100 may determine a range of motion based on form information of respective subjects, and predict whether the subjects are to collide with each other. Accordingly, the device 100 may prevent a collision between the subjects in advance.

Figure 22:
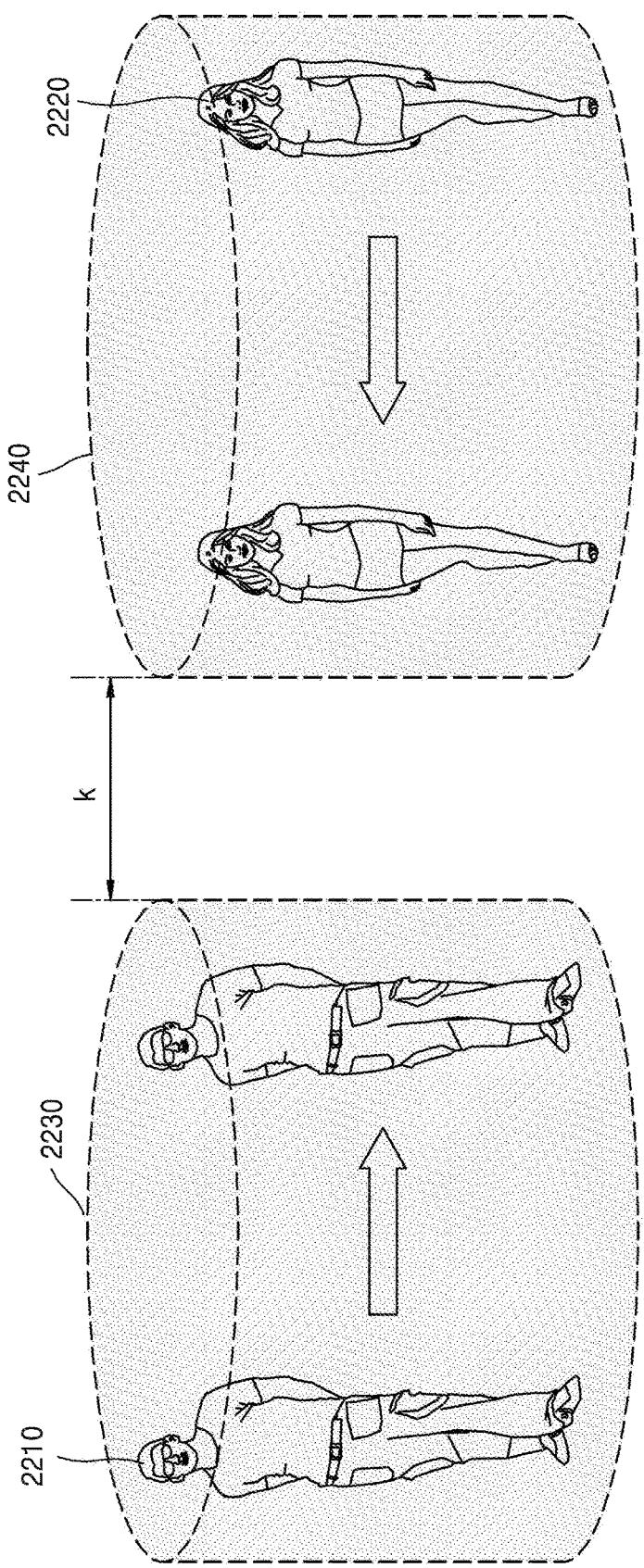
FIG. 22 illustrates a diagram for explaining an example of comparing a shortest distance between subjects to a predetermined distance value, the comparing being performed by a device according to an embodiment of the present disclosure.

FIG. 22 illustrates a diagram for explaining an example of comparing a shortest distance between subjects to a predetermined distance value, the comparing being performed by a device 100, according to an embodiment of the present disclosure.

Referring to FIG. 22, it is shown that both a first subject 2210 and a second subject 2220 are users of content. However, the first subject 2210 and the second subject 2220 are not limited thereto. In other words, the second subject 2220 may be a non-user of the content, or may correspond to a thing such as an animal, a plant, or furniture.

As described above with reference to FIG. 18, the device 100 may determine ranges of motion 2230 and 2240 of the users 2210 and 2220, based on at least one of a moving path of the first user 2210 and the second user 2220 and a motion that is to be taken by the first user 2210 and the second user 2220. The device 100 calculates a shortest distance k between the first object 2210 and a second object 2220 based on the ranges of motion 2230 and 2240 of the users 2210 and 2220, and predicts a possibility of a collision between the first user 2210 and a second user 2220 based on the shortest distance k. A method of predicting a possibility of a collision between users, which is performed by the device 100, is described above with reference to FIGS. 19 through 20C.

Figure 23A:
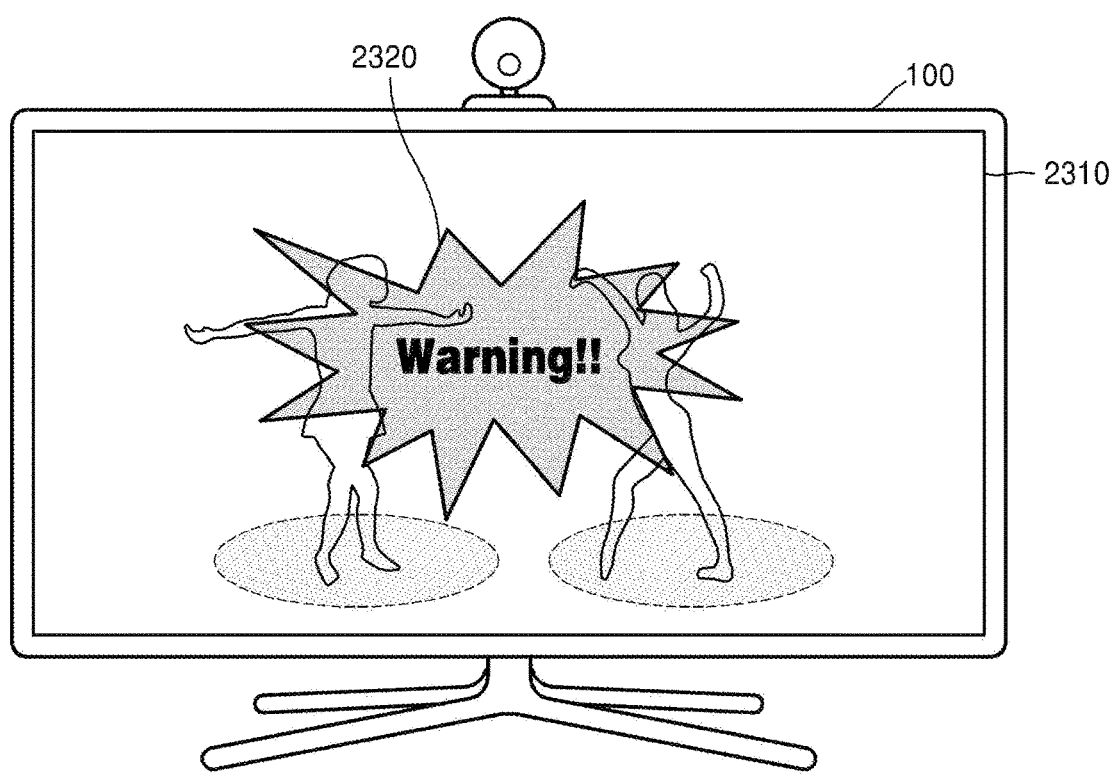
FIGS. 23A, 23B, and 23C illustrate diagrams showing an example of an image output to a screen of a device, if the device determines that users are to collide with each other according to an embodiment of the present disclosure.
Figure 23B:
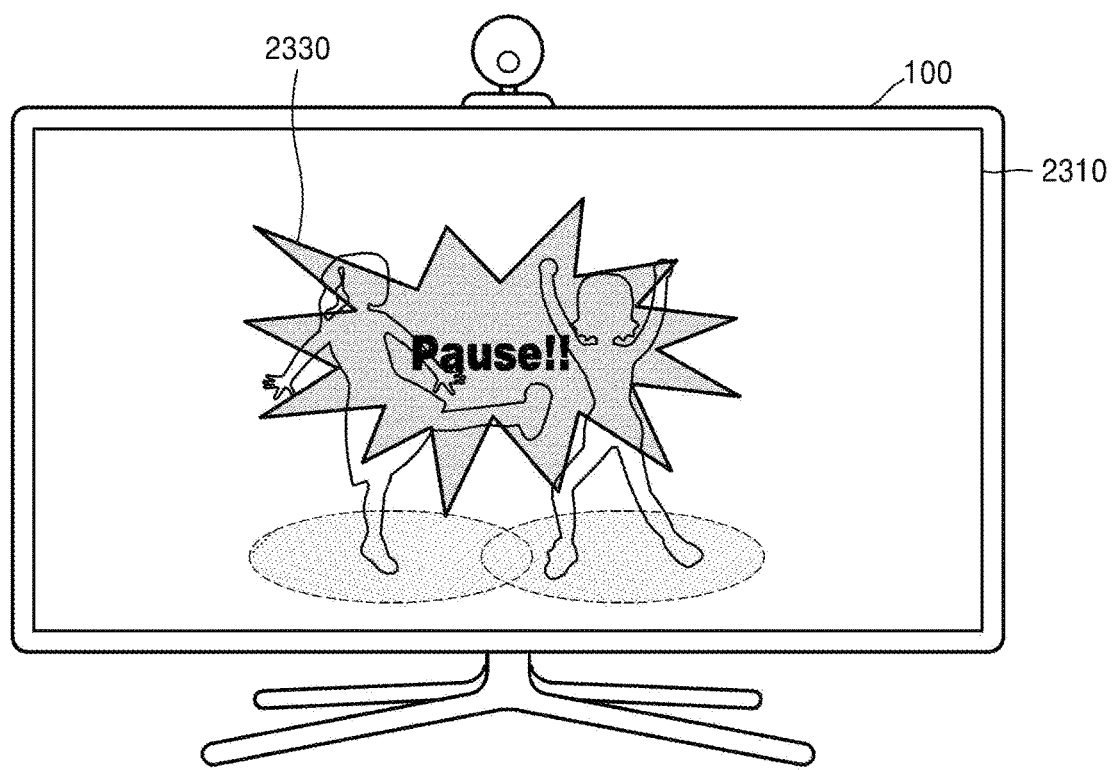
Figure 23C:
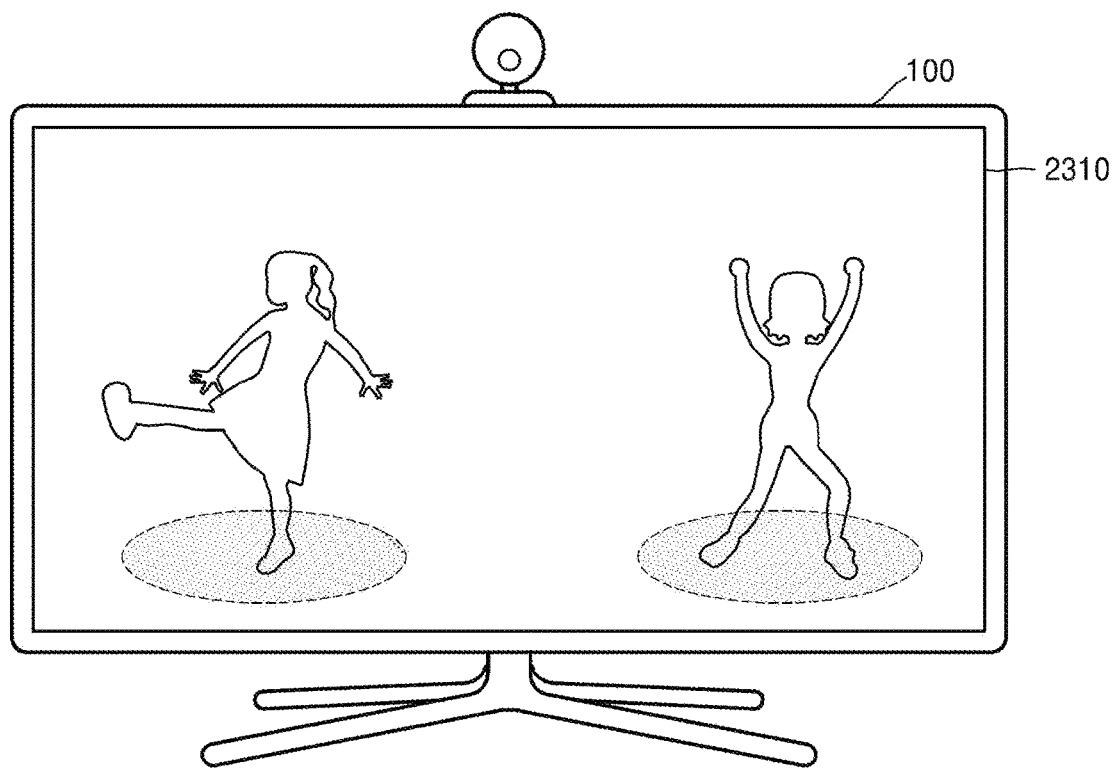

FIGS. 23A through 23C illustrate diagrams showing an example of an image output to a screen of a device, if the device determines that users are to collide with each other, according to an embodiment of the present disclosure.

Referring to FIGS. 23A through 23C, if it is predicted that the users are to collide with each other, the device 100 may output an image 2320 indicating that the objects are to collide with each other to a screen 2310. As an example, as shown in FIG. 23A, the device 100 may output the image 2330 notifying to the users a possibility of a collision therebetween to the screen 2310. As another example, as shown in FIG. 23B, the device 100 may pause execution of content, while outputting the image 2330 notifying to the users a possibility of a collision therebetween to the screen 2310 at the same time. After the images 2320 and 2330 are output to the screen 2310, if the users readjust their location, the device 100 re-predicts a possibility of a collision between the users based on the readjusted location. As shown in FIG. 23C, if it is determined that a collision between the users is impossible, the device 100 may continuously execute the content instead of outputting the images 2320 and 2330 to the screen 2310.

As described with reference to FIGS. 2 through 23C, the device 100 may predict a possibility of a collision between subjects based on a range of motion of the subjects. The device 100 may set a safety zone or a danger zone in a space. Then, if the subject goes out of the safety zone or if the subject enters the danger zone, the device 100 may output warning information.

Hereinafter, with reference to FIG. 24, an example of setting a danger zone or a safety zone, which is performed by a device, is described. Additionally, with reference to FIG. 25, an example of outputting warning information if a subject goes out of a safety zone or a subject enters a danger zone, the outputting being performed by a device, is described.

Figure 24:
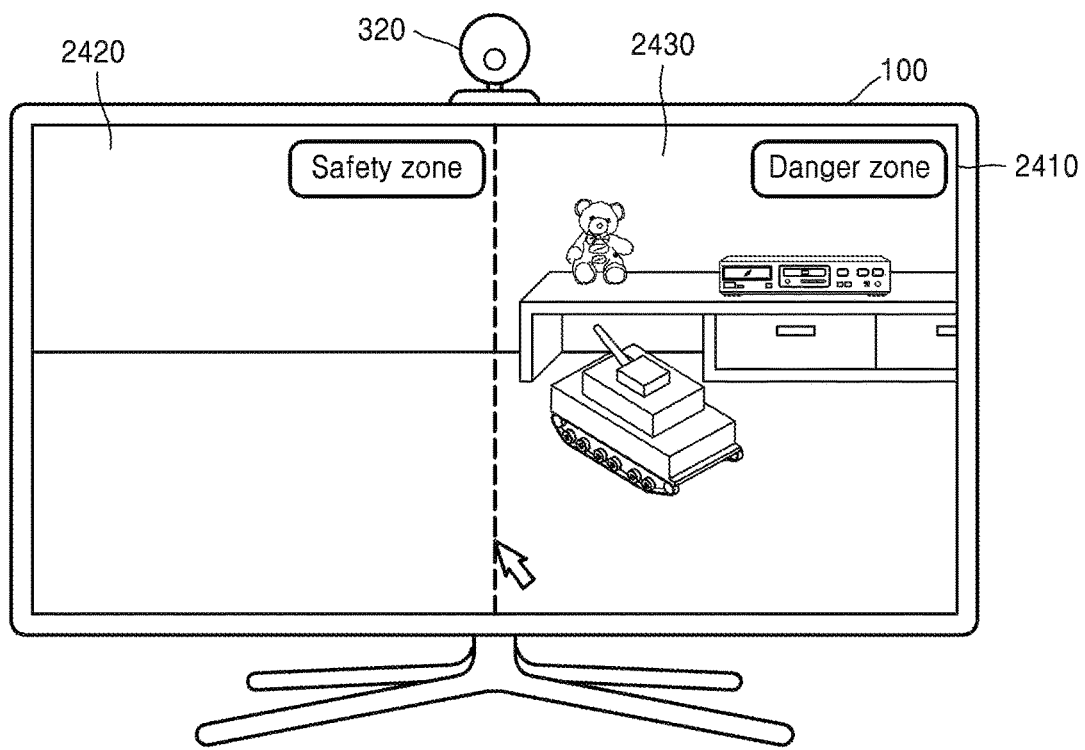
FIG. 24 illustrates a diagram for explaining an example of setting a safety area or a danger zone, the setting being performed by a device according to an embodiment of the present disclosure.

FIG. 24 illustrates a diagram for explaining an example of setting a safety area or a danger zone, the setting being performed by a device, according to an embodiment of the present disclosure.

Referring to FIG. 24, an example of outputting an image showing a space to a screen 2410, which is performed by the device 100, is shown. A space described herein refers to a space photographed by the camera 320. The device 100 may output an image indicating a space to the screen 2410 by using data transmitted from the camera 320. Additionally, the device 100 may classify and set the space as a safety zone 2420 or a danger zone 2430.

As an example, the device 100 may set the safety zone 2420 and the danger zone 2430 based on information input by a user. The user may input information for classifying the space into as safety zone 2420 or the danger zone 2430 to an image output to the screen 2410. For example, the user may select a certain area in the image, and designate the selected area as the safety zone 2420 or the danger zone 2430. If the user designates the selected area as the safety zone 2420, a remaining area other than the safety zone 2420, from among the space in the image, is determined as the danger zone 2430.

As another example, the device 100 may automatically designate a space as the safety zone 2420 or the danger zone 2430 without intervention of a user. For example, the device 100 may designate an empty space where a thing is not present in the image as the safety zone 2420, and a space in which a thing is present in the image as the danger zone 2430.

After the device 100 designates the space as the safety zone 2420 or the danger zone 2430, if a subject goes out of the safety zone 2420 or enters the danger zone 2430, the device 100 may output warning information. Hereinafter, with reference to FIG. 25, an example of outputting warning information, which is performed by the device 100, is described.

Figure 25:
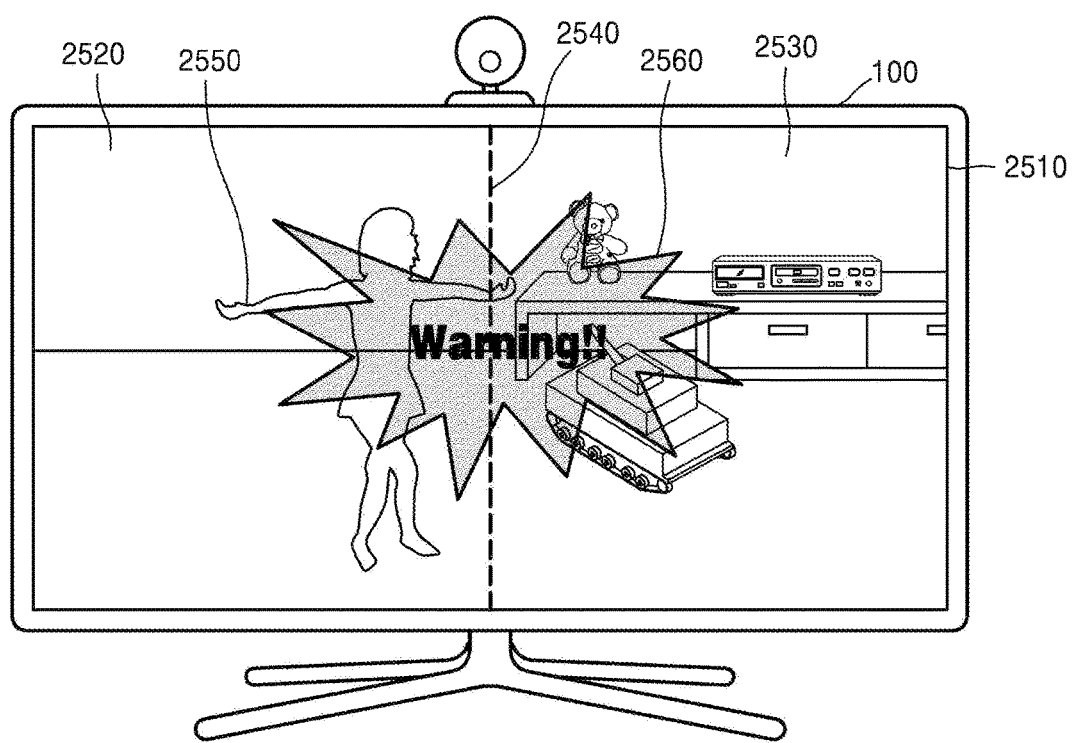
FIG. 25 illustrates a diagram for explaining an example of outputting warning information if a subject goes out of a safety area or a subject enters a danger zone, the outputting being performed by a device according to an embodiment of the present disclosure.

FIG. 25 illustrates a diagram for explaining an example of outputting warning information if a subject goes out of a safety area or a subject enters a danger zone, the outputting being performed by a device, according to an embodiment of the present disclosure.

Referring to FIG. 25, an example is illustrated in which a safety zone 2520 and a danger zone 2530 are set in an image output to a screen 2510 of the device 100. FIG. 25 shows an example in which a boundary 2540 between the safety zone 2520 and the danger zone 2530 is displayed on the screen 2510. However, the boundary 2540 may not be displayed.

If a subject represented by an object 2550 goes out of the safety zone 2520 (or enters the danger zone 2530), the device 100 may output warning information. For example, if it is assumed that the subject is a user playing a dancing game, if a part of a body of the user goes out of the safety zone 2520 while playing the dancing game (that is, if the object 2550 is output to the screen 2510 as being out of the safety zone 2520), the device 100 may output warning information. The warning information may be light, a color, a certain image, etc., output from the screen 2510 of the device 100, or a sound output from a speaker included in the device 100. Additionally, if the device 100 is executing content, the device 100 may pause the executing of the content as an example of the warning information.

For example, if the user goes out of the safety zone 2520, the device 100 may display an image 2560 instructing the object 2550 to move to the safety zone 2520, or may pause the executing of the content.

The device 100 may designate some things that are present in a space as dangerous things, and, if the subject is in close proximity to the dangerous things, output warning information.

Hereinafter, with reference to FIG. 26, an example of designating a dangerous thing, which is performed by a device, is described. Additionally, referring to FIG. 27, an example of outputting warning information if a subject enters a dangerous thing, which is performed by a device, is described.

Figure 26:
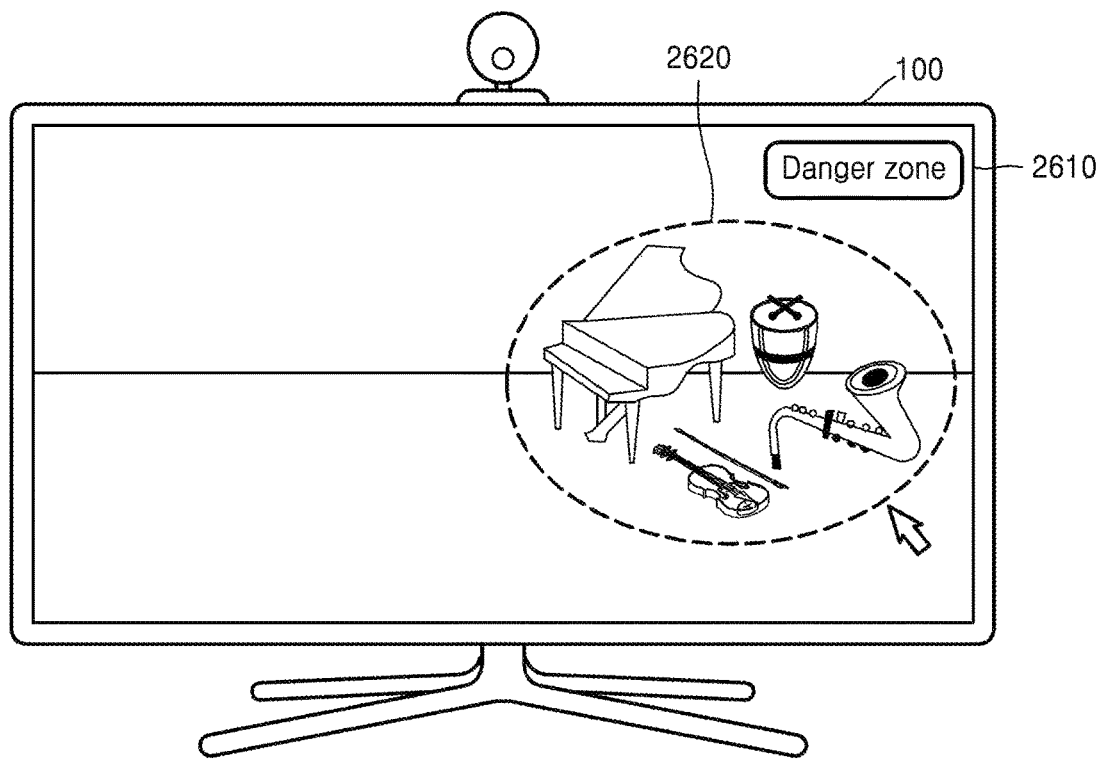
FIG. 26 illustrates a diagram for explaining an example of designating a dangerous thing, the designating being performed by a device according to an embodiment of the present disclosure.

FIG. 26 illustrates a diagram for explaining an example of designating a dangerous thing, the designating being performed by a device, according to an embodiment of the present disclosure.

Referring to FIG. 26, an example of outputting an image showing a space to a screen 2610, which is performed by the device 100, is shown. The space refers to a space photographed by the camera 320. The device 100 may output an image showing a space to the screen 2610 by using data transmitted from the camera 320. Additionally, the device 100 may designate some things that are present in the space as a group of dangerous things 2620.

As an example, the device 100 may designate the group of dangerous things 2620 based on information input by a user. The user may input information for designating the group of dangerous things 2620 to an image output to the screen 2410. For example, the user may select a certain thing from the image, and designate the selected thing as the group of dangerous things 2620.

As another example, the device 100 may automatically designate the group of dangerous things 2620 without intervention of a user. For example, the device 100 may designate all things present in the space shown in the image as the group of dangerous things 2620. Alternatively, the device 100 may designate a thing having characteristics that match predetermined criteria, as the group of dangerous things 2620. For example, the device 100 may designate all objects having a sharp surface or a pointed corner as the group of dangerous things 2620.

After the device 100 designates the group of dangerous things 2620, if a subject enters the group of dangerous things 2620, the device 100 may output warning information. Hereinafter, with reference to FIG. 27, an example of outputting warning information, which is performed by a device, is described.

Figure 27:
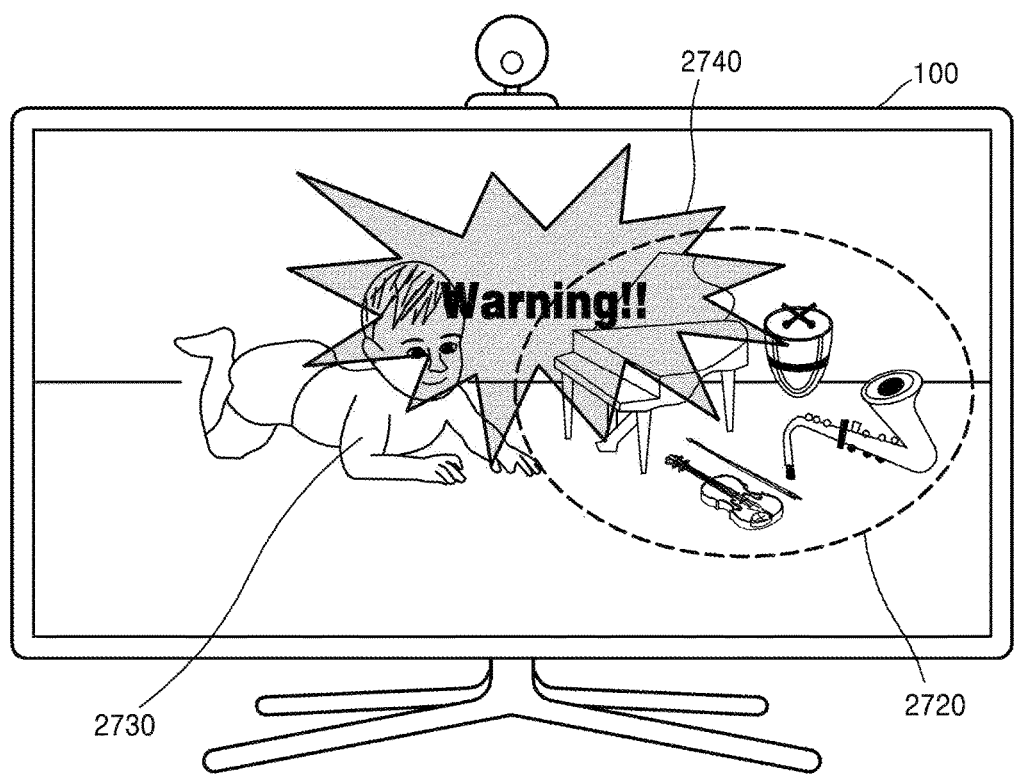
FIG. 27 illustrates a diagram for explaining an example of outputting warning information if a subject goes close to a dangerous thing, the outputting being performed by a device according to an embodiment of the present disclosure.

FIG. 27 is a diagram for explaining an example of outputting warning information if a subject goes close to a dangerous thing, which is performed by a device, according to an embodiment of the present disclosure.

Referring to FIG. 27, an example of designating a dangerous thing 2720 in an image output to a screen 2710 of the device 100 is illustrated. If an object 2730 is output to the screen 2710 as being in close proximity to the dangerous thing 2720 (actually, if a subject represented by the object 2730 is in close proximity to the dangerous thing 2720), the device 100 may output warning information 2740. For example, if a baby is in close proximity to the dangerous thing 2720, the device 100 may output warning information 2740. An example of the warning information is described above with reference to FIG. 25.

As described above with reference to FIGS. 2 through 27, the device 100 may autonomously output warning information. However, the outputting of the warning information is not limited thereto. In other words, if the warning information is to be output, the device 100 may transmit a warning information signal to another device.

Figure 28:
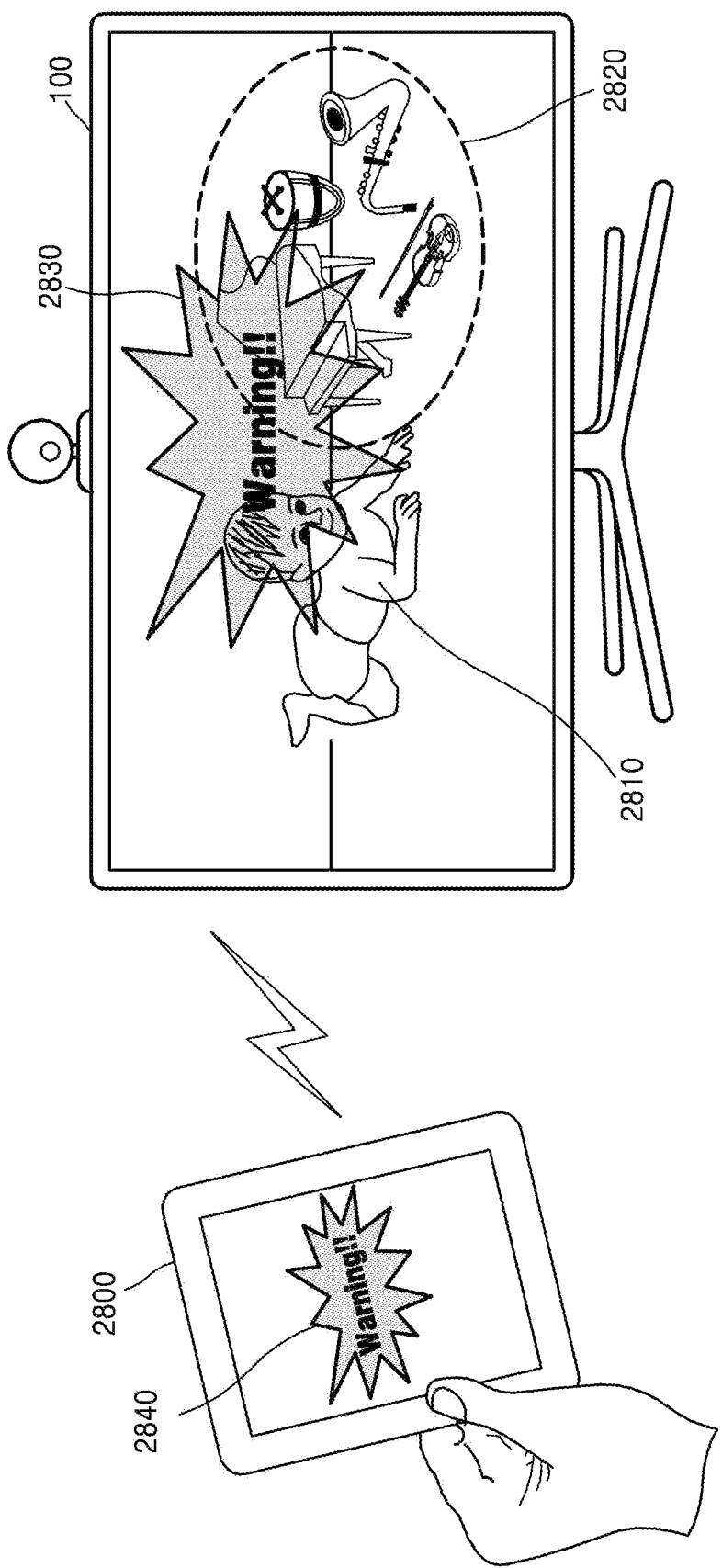
FIG. 28 illustrates a diagram for explaining an example of transmitting warning information to another device, the transmitting being performed by a device according to an embodiment of the present disclosure.

FIG. 28 illustrates a diagram for explaining an example of transmitting warning information to another device, the transmitting being performed by a device, according to an embodiment of the present disclosure.

Referring to FIG. 28, the device 100 may autonomously output warning information or transmit warning information to another device 2800. For example, if an object 2810 representing a baby is output to a screen of the device 100 as being in close proximity to the a dangerous thing 2820, the device 100 may autonomously output a warning image 2830 and, at a same time, transmit warning information to the other device 2800 connected to the device 100. Then, the other device 2800 may output a warning image 2840. Here, the device 100 and the other device 2800 may be connected to each other by using a wired or wireless communication method.

FIG. 28 shows warning images 2830 and 2840 as an example of the warning information, but an example of the warning information is not limited thereto. The device 100 and the other device 2800 may output warning information described as an example with reference to FIG. 25.

FIG. 29 is a block diagram of an example of a device according to an embodiment of the present disclosure.

Referring to FIG. 29, the device 100 includes an input unit 2910, a control unit 2920, and an output unit 2930.

The device 100 shown in FIG. 29 includes constituent elements for performing the method of preventing a collision between a plurality of subjects, described above, with reference to FIGS. 1 through 28. Accordingly, it will be understood that the descriptions provided with reference to FIGS. 1 through 28 may also be applied to the device 100 shown in FIG. 29, even if the descriptions are not provided here again.

The device 100 shown in FIG. 29 includes only elements described with reference to the current embodiment. Accordingly, it may be understood by one of ordinary skill in the art that, in addition to the elements shown in FIG. 29, other general-use elements may be further included.

The input unit 2910 receives an image, captured by the camera 320, from the camera 320. For example, the input unit 2910 may include a wired communication interface or a wireless communication interface. The input unit 2910 may receive an image from the camera 320 via at least one of the wired communication interface and the wireless communication interface.

The wired communication interface may include a high-definition multimedia interface (HDMI), a digital visual interface (DVO), or the like, but is not limited thereto.

The wireless communication interface may include a Bluetooth communication unit, a Bluetooth low energy (BLE) communication unit, a short-range communication interface, a Wi-Fi communication unit, a Zigbee communication unit, an infrared Data Association (IrDA) communication unit, a Wi-Fi Direct (WFD) communication unit, a ultra wideband (UWB) communication unit, or an Ant+ communication unit, but is not limited thereto.

The wireless communication interface may transceive a wireless signal to and from at least one of a base station, an external terminal (for example, the camera 103), and a server on a mobile communication network. The wireless signals may include a voice call signal, a video phone call signal or various forms of data used to transceive text or multimedia messages.

The input unit 2910 includes a unit for inputting data so that the user may control the device 100. For example, the input unit 2910 may include a key pad, a dome switch, a touch pad, which may be a capacitive overlay type, a resistive overlay type, an infrared beam type, a surface acoustic wave type, an integral strain gauge type, or a piezo electric type, a jog wheel, or a jog switch, but is not limited thereto.

The control unit 2920 obtains form information of a first subject and form information of a second subject. As an example, if it is assumed that content is executed, the first subject may refer to a user of the content. The second subject may refer to another user who uses the content together with the first object, or may refer to a non-user that does not use the content. The second subject may be an animal, a plant, or a thing such as furniture. The content described herein refers to a program which requires a motion of a user. For example, a computer game executed based on a motion of a user, such as a dancing game or a sport game, may correspond to the content.

Form information refers to information indicating a form of a subject. A form includes a length and a volume of the subject as well as a shape of the subject. As an example, if it is assumed that an object is a person, form information includes all information indicating an outer shape of the person such as a height, a length of arms, a length of legs, a thickness of a trunk, a thickness of arms, a thickness of legs of the person, and the like. If it is assumed that a subject is a chair, form information includes all information indicating an outer shape of the chair such as a height, a width of the chair, and the like.

The control unit 2920 determines a range of motion of the first subject by using form information of the first subject, and a range of motion of the second subject by using form information of the second subject. A range of motion refers to a range which includes points reachable by at least a part of a subject. As an example, a range of motion of a subject may be a range which includes points that a part of the subject may reach while the subject remains in a designated area. As another example, a range of motion of a subject may be a range which includes points that a part of the subject may reach while the subject is moving along a certain path. As another example, a range of motion of a subject may be a range which includes points that a part of the subject may reach as the subject moves in a certain area.

If the content requires moving of a user, the control unit 2920 may determine a range of motion of the user based on a moving path of the user. Additionally, the control unit 2920 may determine a range of motion of the subject based on input information of a user.

The control unit 2920 predicts whether the first subject and the second subject are to collide with each other, based on whether a range of motion of the first subject and a range of motion of the second subject overlap with each other. The predicting of whether the first subject and the second subject are to collide with each other refers to predicting of a possibility of a collision between the first and second subjects when the first and second subjects do not collide with each other. For example, if a difference between the range of motion of the first user and the range of motion of the second user has a value less than a certain value, the control unit 2920 may determine that the first user and the second user collide with each other.

The output unit 2930 outputs an image to a screen of the device 100 or outputs warning information via a speaker included in the device 100. For example, the output unit 2930 may output an object representing a subject to a screen, and output a warning signal via the screen or a speaker.

Additionally, all or a part of the input unit 2910, the control unit 2920, and the output unit 2930 may be operated by using a software module, but the operating of the input unit 2910, the control unit 2920, and the output unit 2930 is not limited thereto.

Additionally, the input unit 2910, the control unit 2920, and the output unit 2930 may be operated by one or more processors, but the operating of the input unit 2910, the control unit 2920, and the output unit 2930 is not limited thereto.

Figure 30:
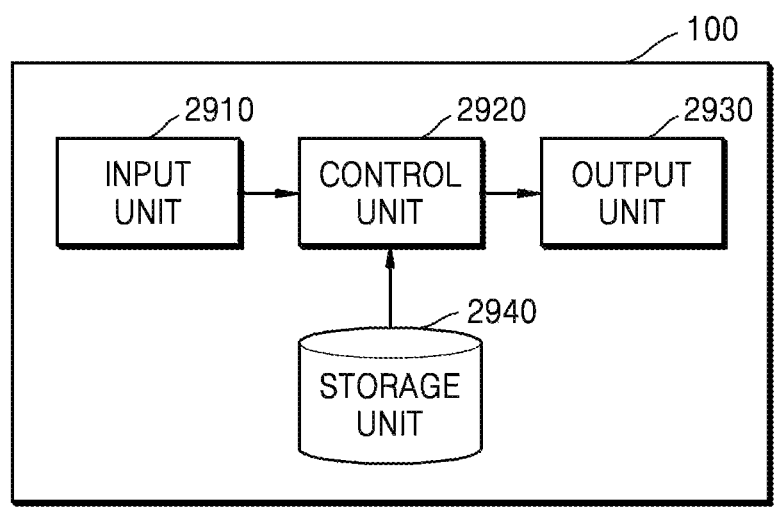
FIG. 30 illustrates a block diagram of an example of a device according to an embodiment of the present disclosure.

FIG. 30 is a block diagram of an example of a device according to an embodiment of the present disclosure.

The device 100 shown in FIG. 30 includes constituent elements for performing a method of preventing a collision between a plurality of subjects, described above, with reference to FIGS. 1 through 28. Accordingly, it will be understood that the descriptions provided with reference to FIGS. 1 through 28 may also be applied to the device 100 shown in FIG. 30, even if the descriptions are not provided here again.

The device 100 shown in FIG. 30 includes only elements described with reference to the current embodiment. Accordingly, it may be understood by one of ordinary skill in the art that, in addition to the elements shown in FIG. 30, other general-use elements may be further included.

Referring to FIG. 30, the control unit 2920 reads and analyzes details that are included in content stored in a storage unit 2940. For example, if it is assumed that a subject includes a user of the content and the content is being executed, the control unit 2920 obtains information about a moving path of the subject by analyzing the details included in the content. Additionally, the control unit 2920 determines a range of motion of the subject by using the obtained information. Another example in which the control unit 2920 is operated is described above with reference to FIG. 29.

The control unit 2920 generates warning information. In more detail, if it is determined that subjects are to collide with each other, the control unit 2920 generates warning information. The warning information may be light, a color, a certain image, etc., output from a screen of the device 100, or a sound output from a speaker included in the device 100. Additionally, if the device is executing content, the device 100 may pause the executing of the content as an example of the warning information.

The storage unit 2940 stores data regarding form information and a range of motion of a subject. Additionally, the storage unit 2940 stores a mapping table that is necessary for determining a range of motion of the subject. The storage unit 2940 stores details of content executed by the device 100.

FIG. 31 is a block diagram of an example of a system for executing content according to an embodiment of the present disclosure.

Referring to FIG. 31, the system 1 includes the apparatus 101 for executing content, the display apparatus 102, and the camera 103. If it is assumed that the content is a computer game, the apparatus 101 for executing content refers to a game console.

The apparatus 101 for executing content, the display apparatus 102, and the camera 103 may be connected to each other via a cable, and transceive data between each other via the cable (that is, by using a wired communication method). Alternatively, the apparatus 101 for executing content, the display apparatus 102, and the camera 103 may transceive data between each other by using a wireless communication method. Hereinafter, an input unit 3110 and an output unit 3130 included in the apparatus 101 for executing content are described. However, elements corresponding to the input unit 3110 and the output unit 3130 may be included respectively in the camera 103 and the display apparatus 102.

The camera 103 captures an image of a subject (that is, an object), and transmits the captured image to the apparatus 101 for executing the content. An example in which the camera 103 is operated is described above with reference to FIGS. 1 through 28.

Operations of an input unit 3110, a control unit 3120, and a storage unit 3140 included in the apparatus 101 for executing content are described with reference to FIGS. 29 through 30. Thus, a detailed description thereof is not provided here.

The output unit 3130 transmits an image showing a form of an object or warning information to the display apparatus 102. For example, the output unit 3130 may include a wired communication interface or a wireless communication interface. The output unit 3130 may transmit the image or the warning information to the display apparatus 102 via at least one of the interfaces described above.

The wired communication interface may include a HDMI, a digital visual interface, or the like, but is not limited thereto.

The wireless communication interface may include a Bluetooth communication interface, a Bluetooth low energy (BLE) communication interface, a near-field communication (NFC) interface, a Wi-Fi communication interface, a Zigbee communication interface, an infrared Data Association (IrDA) communication interface, a Wi-Fi Direct (WFD) communication interface, a ultra wideband (UWB) communication interface, or an Ant+ communication interface, but is not limited thereto.

Additionally, the wireless communication interface may transceive a wireless signal with at least one of a base station, an external terminal, for example, the display apparatus 102, and a server on a mobile communication network.

The wireless signal may include a voice signal, a video phone call signal or various forms of data used to transceive text or multimedia messages.

The display apparatus 102 outputs the image or the warning information received from the apparatus 101 for executing content.

As described above, according to the one or more of the above embodiments, the device 100 or the apparatus 101 for executing content may determine a range of motion that includes points reachable by subjects, based on form information of each subject, and predict whether the subjects are to collide with each other. Accordingly, the device 100 or the apparatus 101 for executing content may prevent a collision of the subjects in advance. Additionally, the device 100 or the apparatus 101 for executing the content may generate warning information or pause execution of the content if the collision of the subjects is predicted.

In addition, other embodiments can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments. The media may also be a distributed network, so that the computer-readable code is stored/transferred and executed in a distributed fashion. Furthermore, the processing element could include a processor or a computer processor, and processing elements may be distributed and/or included in a single device It should be understood that the embodiments described therein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a camera; and
   at least one processor configured to:
      capture an image using the camera based on a predetermined time interval,
      determine a location of a first object and a second object and predict a movement to another location of at least one of the first object and the second object based on content of an application, the first object and the second object being included in the captured image,
      predict a possibility of a collision between the first object and the second object based on the predicted movement,
      in response to the predicting of the possibility of the collision while the application is executed, control to pause the execution of the application, and
      in response to a predicting that the possibility of the collision is removed while the application is paused, control to resume the execution of the application.

2. The electronic device of claim 1, wherein the at least one processor is further configured to control transmission of information indicating the execution state of the application to a display apparatus.

3. The electronic device of claim 1, wherein the at least one processor is further configured to:
   determine a first area, which includes a farthest point reachable by a part of the first object as the first object moves in a certain area, and
   determine a second area, which includes a farthest point reachable by a part of the second object as the second object moves in the certain area.

4. The electronic device of claim 3, wherein the at least one processor is further configured to predict that there is a possibility of a collision between the first object and the second object if the first area and the second area overlap with each other.

5. The electronic device of claim 4, wherein the at least one processor is further configured to control transmission of warning information indicating the collision to a display apparatus based on the predicted possibility.

6. The electronic device of claim 3, wherein the at least one processor is further configured to:
   determine a location of at least one of the first object and the second object,
   predict a movement to another location by the at least one of the first object and the second object, based on details of the application, and
   determine at least one of the first area and the second area by further taking into account the predicted movement.

7. The electronic device of claim 1, wherein at least one of the first object and the second object comprises a user participating in the application.

8. A method for executing an application, the method comprising:
   capturing an image using a camera based on a predetermined time interval;
   determining a location of a first object and a second object and predicting a movement to another location of at least one of the first object and the second object based on content of an application, the first object and the second object being included in the captured image;
   predicting a possibility of a collision between the first object and the second object based on the predicted movement;
   in response to the predicting of the possibility of the collision while the application is executed, controlling to pause the execution of the application; and
   in response to a predicting that the possibility of the collision is removed while the application is paused, controlling to resume the execution of the application.

9. The method of claim 8, further comprising controlling transmission of information indicating the execution state of the application to a display apparatus.

10. The method of claim 8, further comprising:
    determining a first area, which includes a farthest point reachable by a part of the first object as the first object moves in a certain area; and
    determining a second area, which includes a farthest point reachable by a part of the second object as the second object moves in the certain area.

11. The method of claim 10, further comprising predicting that there is a possibility of a collision between the first object and the second object if the first area and the second area overlap with each other.

12. The method of claim 11, further comprising controlling transmission of warning information indicating the collision to a display apparatus based on the predicted possibility.

13. The method of claim 10, further comprising:
  determining a location of at least one of the first object and the second object;
  predicting a movement to another location by the at least one of the first object and the second object, based on details of the application; and
  determining at least one of the first area and the second object by further taking into account the predicted movement.

14. The method of claim 8, wherein at least one of the first object and the second object comprises a user participating in the application.

15. A non-transitory computer readable storage medium storing a computer program for executing an application, wherein the program comprises instructions to:
  capture an image using a camera based on a predetermined time interval;
  determine a location of a first object and a second object and predict a movement to another location of at least one of the first object and the second object based on content of an application, the first object and the second object being included in the captured image;
  predicting a possibility of a collision between the first object and the second object based on the predicted movement;
  in response to the predicting of the possibility of the collision while the application is executed, control to pause the execution of the application; and
  in response to a predicting that the possibility of the collision is removed while the application is paused, control to resume the execution of the application.

* * * * *